United States Patent [19]

Oneda

[11] Patent Number: 5,965,860
[45] Date of Patent: *Oct. 12, 1999

[54] MANAGEMENT SYSTEM FOR USING IC CARD WITH REGISTERED PERSONAL INFORMATION

[75] Inventor: Hideo Oneda, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/732,056

[22] Filed: Oct. 17, 1996

[51] Int. Cl.$^6$ ........................................ G06K 5/00
[52] U.S. Cl. .......................... 235/382; 235/375
[58] Field of Search ..................... 235/375, 323, 235/384, 382; 340/825.34, 825.31

[56] References Cited

U.S. PATENT DOCUMENTS

| | | |
|---|---|---|
| 3,647,284 | 3/1972 | Virgil et al. . |
| 5,249,870 | 10/1993 | Westervelt et al. . |
| 5,412,564 | 5/1995 | Ecer . |
| 5,475,377 | 12/1995 | Lee ...................................... 340/825.34 |
| 5,565,857 | 10/1996 | Lee ........................................... 235/375 |

FOREIGN PATENT DOCUMENTS

| | | |
|---|---|---|
| 196 41357 A1 | 4/1998 | Germany . |
| WO 95/35546 | 6/1995 | WIPO . |
| WO 96 01455 | 1/1996 | WIPO . |

OTHER PUBLICATIONS

Copy of European Search Report dated Nov. 27, 1998.
Patent Abstracts of Japan, vol. 095, No. 003, Apr. 28, 1995 & JP 06 348404 A, Dec. 22, 1994.

*Primary Examiner*—Thien Minh Le
*Attorney, Agent, or Firm*—Staas & Halsey

[57] ABSTRACT

An IC card having therein an IC including a processor and a memory is issued to a consumer. The consumer himself registers personal information onto the card. The card in which the personal information has been registered is set into a terminal device of a service providing system and receives an automatic presentation of the service. Upon registration, the consumer sets a disclosure flag with respect to only the information to be disclosed, thereby providing the personal information only when the disclosure flag has been set in response to a request of the personal information from the service providing system. When the disclosure flag has been reset, the consumer doesn't provide the personal information.

20 Claims, 31 Drawing Sheets

FIG. 5A

| ITEM | ATTRIBUTE | DISCLOSURE FLAG | | | | | |
|---|---|---|---|---|---|---|---|
| | | RESERVATION | MEMBERSHIP CLUB | SIZE | FACILITIES | MEMBER | COME UP |
| FUNDAMENTAL | ADDRESS | 1 | 1 | 1 | 1 | 1 | 1 |
| | NAME | 1 | 1 | 1 | 1 | 1 | 1 |
| | AGE | 1 | 1 | 1 | 0 | 1 | 0 |
| | BIRTHDAY | 0 | 0 | 0 | 0 | 1 | 0 |
| | SEX | 1 | 1 | 1 | 1 | 1 | 0 |
| | TELEPHONE NO. | 0 | 0 | 1 | 1 | 1 | 1 |
| | BIRTH PLACE | 0 | 0 | 0 | 0 | 1 | 0 |
| | SCHOOL CAREER | 0 | 0 | 0 | 0 | 1 | 0 |
| HEALTH | HEIGHT | 0 | 0 | 1 | 1 | 0 | 0 |
| | WEIGHT | 0 | 0 | 1 | 1 | 0 | 0 |
| | CHEST CIRCUMFERENCE | 0 | 0 | 0 | 1 | 0 | 0 |
| | VISUAL POWER | 0 | 0 | 0 | 1 | 0 | 0 |
| | BLOOD PRESSURE | | | | | | |

| | | | | | | | |
|---|---|---|---|---|---|---|---|
| FAMILY | WIFE | 0 | 0 | 0 | 1 | 1 |
| | ONE BOY | 0 | 1 | 0 | 1 | 1 |
| | ONE GIRL | 0 | 1 | 0 | 1 | 1 |
| | WEDDING ANNIVERSARY | 0 | 0 | 0 | 0 | 1 |
| | BIRTHDAY | 0 | 0 | 0 | 0 | 1 |
| WORK | ANNUAL INCOME | 0 | 0 | 0 | 1 | 0 |
| | PLACE OF EMPLOYMENT | 0 | 1 | 1 | 1 | 0 |
| | RESIDENT TYPE | 0 | 0 | 0 | 1 | 0 |

FIG. 7A

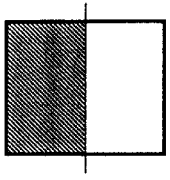

| SYSTEM ID | CONTENTS | ATTRIBUTE | DISCLOSURE FLAG | PRIORITY | ADMITTING CONDITIONS (MINIMUM) |
|---|---|---|---|---|---|
| RESERVATION | AIRLINE | FIRST | 0 | | |
| | | ECONOMY | 1 | | |
| | | NON-SMOKING | 1 | ① | LOWEST LIMIT OF PRIORITY ② |
| | | WINDOW SIDE | 1 | ② | PLUS OR MINUS 30 MINUTES |
| | | FRONT | 1 | ③ | |
| | | UPPER LIMIT CHARGE | 0 | | |
| | TRAIN | NOZOMI | 1 | ① | |
| | | HIKARI | 1 | ② | |
| | | KODAMA | 1 | ③ | |
| | | GREEN | 0 | | |
| | | UNRESERVED SEAT | 0 | | LOWEST LIMIT OF PRIORITY ④ |
| | | RESERVED SEAT | 1 | ⑤ | PLUS OR MINUS 60 MINUTES |
| | | NON-SMOKING | 1 | ④ | |
| | | WINDOW SIDE | 0 | | |
| | | BERTH | 0 | | |

| | | | | |
|---|---|---|---|---|
| HOTEL | SINGLE | 1 | ② | |
| | DOUBLE | 1 | ① | |
| | TWIN | 1 | ④ | |
| | CONNECT | 0 | | |
| | SUITE | 0 | | |
| | UPPER LIMIT CHARGE | 1 | ③ | LOWEST LIMIT OF PRIORITY ③ |
| THEATER | S SEAT | 1 | ① | |
| | A SEAT | 1 | ② | |
| | OTHERS | 0 | | |
| | RIGHT SIDE | 1 | ④ | |
| | CENTER | 1 | ③ | |
| | LEFT SIDE | 1 | ⑤ | |
| | UPPER LIMIT CHARGE | 1 | ⑥ | LOWEST LIMIT OF PRIORITY ④ |

F I G. 8

| SYSTEM ID | CONTENTS | ATTRIBUTE | DISCLOSURE FLAG | | | |
|---|---|---|---|---|---|---|
| | | | ANA | JAL | JAS | OTHERS |
| RESERVATION | AIRLINE | FIRST | 0 | 0 | 1 | 0 |
| | | ECONOMY | 1 | 1 | 0 | 1 |
| | | NON-SMOKING | 1 | 1 | 1 | 1 |
| | | WINDOW SIDE | 1 | 1 | 1 | 1 |
| | | FRONT | 1 | 0 | 0 | 1 |
| | | UPPER LIMIT CHARGE | 0 | 0 | 1 | 0 |

FIG. 9

| SYSTEM ID | ATTRIBUTE | DISCLOSURE FLAG | PRIORITY |
|---|---|---|---|
| MEMBERSHIP CLUB | GIFT CERTIFICATE | 1 | ① |
| | INVITATION TICKET | 1 | ④ |
| | DISCOUNT TICKET | 1 | ② |
| | INFORMATION CARD | 1 | ③ |

| SYSTEM ID 58 | CONTENTS 60 | ATTRIBUTE 62 | DISCLOSURE FLAG 64 | PRIORITY 66 | REWRITE FLAG 72 | ADMITTING CONDITIONS (MINIMUM) 68 |
|---|---|---|---|---|---|---|
| SIZE MANAGEMENT | SUITS | SIZE | 1 | ① | 1 | |
| | | SINGLE | 1 | ③ | 0 | |
| | | DOUBLE | 1 | ④ | 0 | |
| | | FORMAL | 0 | | 0 | LOWEST LIMIT OF PRIORITY ④ |
| | | BUSINESS | 1 | ② | 0 | |
| | | CASUAL | 0 | | 0 | |
| | | COLOR | 1 | ⑥ | 1 | |
| | | UPPER LIMIT CHARGE | 0 | ⑤ | 1 | |
| | SHIRT | SIZE | 1 | ① | 1 | |
| | | BUSINESS | 1 | ② | 0 | LOWEST LIMIT OF PRIORITY ② |
| | | CASUAL | 0 | | 0 | |
| | | COLOR | 1 | | 1 | |
| | | UPPER LIMIT CHARGE | 1 | ③ | 1 | |

| SHOES | SHOE SIZE | 1 | | ① | 1 | LOWEST LIMIT OF PRIORITY ② |
|---|---|---|---|---|---|---|
| | FORMAL | 0 | | | 0 | |
| | BUSINESS | 1 | | ② | 0 | |
| | CASUAL | 0 | | | 0 | |
| | COLOR | 1 | | ③ | 1 | |
| | UPPER LIMIT CHARGE | 1 | | ② | 1 | |

FIG. 11

| SYSTEM ID (58) | CONTENTS (60) | ATTRIBUTE (62) | DISCLOSURE FLAG (64) |
|---|---|---|---|
| FACILITY MANAGEMENT | VEHICLE | VEHICLE TYPE | 1 |
| | | NUMBER | 1 |
| | | OWNERSHIP | 0 |
| | | COLOR | 0 |
| | | CASH | 1 |
| | | CREDIT | 0 |
| | | THE NUMBER OF USE TIMES | 1 |

| SYSTEM ID 58 | CONTENTS 60 | ATTRIBUTE 62 | DISCLOSURE FLAG 64 |
|---|---|---|---|
| MEMBER MANAGEMENT | TENNIS CLASS | BEGINNER | 0 |
| | | INTERMEDIATE | 1 |
| | | ADVANCED | 0 |
| | | THE NUMBER OF YEARS | 1 |
| | GOLF CLASS | BEGINNER | 1 |
| | | INTERMEDIATE | 0 |
| | | ADVANCED | 0 |
| | | THE NUMBER OF YEARS | 1 |

| SYSTEM ID | CONTENTS | ATTRIBUTE | DISCLOSURE FLAG |
|---|---|---|---|
| COME-UP | BIRTHDAY | WIFE | 1 |
| | | ONE BOY | 1 |
| | | ONE GIRL | 1 |
| | | FATHER | 1 |
| | | MOTHER | 1 |
| | | FATHER-IN-LAW | 1 |
| | | MOTHER-IN-LAW | 1 |
| | WEDDING MEMORY | ANNIVERSARY | 1 |
| | | 5th YEAR | 1 |
| | | 10th YEAR | 1 |
| | | 15th YEAR | 1 |
| | | 20th YEAR | 1 |
| | | 25th YEAR | 1 |
| | MOTHER'S DAY | MOTHER | 1 |
| | | MOTHER-IN-LOW | 1 |
| | DEATH ANNIVERSARY | GRAND FATHER | 0 |
| | | GRAND MOTHER | 0 |

FIG. 18

FUNDAMENTAL INFORMATION
REGISTERATION PICTURE PLANE
90

24

FUNDAMENTAL INFORMATION
REGISTERATION / UPDATE 90-1 ADDRESS ☐☐☐☐☐☐☐☐☐☐☐☐☐
90-2 NAME ☐☐☐☐☐  AGE ☐☐    90-4 ☐ MALE
                      90-3      ☐ FEMALE
90-6                                90-5
    BIRTHDAY ☐☐☐☐/☐☐/☐☐
90-7
    TELEPHONE NO. ☐☐☐☐☐☐☐☐☐
90-8
    BIRTH PLACE ☐☐☐☐
90-10
    SCHOOL     ☐ UNIVERSITY      ☐ HIGH SCHOOL
    CAREER     ☐ JUNIOR COLLEGE  ☐ COLLAGE
90-11                                          75
    ☐ CONFIRM    ☐ CANCEL    ☐ END

FIG. 20

RESERVATION SYSTEM
REGISTERATION PICTURE PLANE
24   94

AIRLINE RESERVATION
REGISTERATION

CLICK DESIRED RESERVING CONDITIONS
AND SET PRIORITY 94-1

| ☐ FIRST | ☐ | ☐ ECONOMY | ☐ |
| ☐ NON-SMOKING SEAT | ☐ | ☐ WINDOW SIDE | ☐ |
| ☐ FRONT | ☐ | | |

UPPER LIMIT CHARGE ☐☐☐☐☐ YEN  ☐ DISCLOSURE PRIORITY ☐
ADMITTING CONDITIONS   PRIORITY LOWEST LIMIT ☐   DELAY TIME ☐☐ MIN

☐ CONFIRM    ☐ CANCEL    ☐ END 94-2                                        75

MANAGEMENT SYSTEM FOR USING IC CARD WITH REGISTERED PERSONAL INFORMATION

BACKGROUND OF THE INVENTION

The invention relates to a personal information management system for registering personal information into an IC card with a built in integrated circuit and for using such information more particularly, the present invention relates to a personal information management system for a card owner to use personal information while managing the registration and disclosure of such information.

Hitherto, personal information for use in a reservation system of a public transport, a hotel, or the like and a service system such as a membership club or the like in a department store is obtained as necessary when a questionnaire or various application forms are written, when articles are purchased, when services are provided, or the like and is managed by each company. In association with the spread of magnetic cards, a service treating company issues a member card to a consumer and records personal information necessary to use services, for example, year, month, and day of the joining, an address, a name, an age, and the like onto the magnetic card by using an ID code such as a member number or the like. The service treating company obtains the necessary personal information by using the magnetic card when the services are used and can accurately get the personal information without difficulty at time of the use. Further, when services are used, the contents of the provide services and personal information, such as a size or the like regarding the article purchased, are recorded from a terminal device of the treating company to the magnetic card, thereby enabling the recorded personal information to be again used when the magnetic card is used next. Further, in recent years, IC cards, which have been standardized by banks and for terminal equipment such as ATM, CD, counter equipment, etc., from which money can be withdrawn with the IC card, have rapidly been put into practical use. The IC card that is issued by a bank has not only a bank using region according to the bank standard format, but also sufficient lending region in order to add an additional value by enabling the IC card to be used. Therefore, it is considered to use the lending region of the IC card for the recording of personal information. Since the memory capacity of the IC card is extremely larger than that of a conventional magnetic card, in addition to fundamental personal information such as address, name, and the like, specific personal information can be also recorded for a plurality of different systems. The use of the IC card as a data bank of personal information having high commonness can be expected. On the other hand, in service industries such as department stores, travelling companied, hotels, or the like, a service system using a computer, such as POS system, reservation system, or the like, has already been constructed. By providing a reader/writer function for the IC card in a terminal device, a system which manages and uses the personal information recorded in the IC card can be constructed.

However, in the conventional personal information management system using a magnetic card or an IC card, the treating company of services registers and manages all of the personal information. Therefore are the problems an that prevent the system from being sufficiently used. First, the service treating company has already expended a great amount of cost for acquisition and registration of personal information, which are executed when questionnaires and various application forms are sent, when goods are purchased, when services are provided, or the like. The costs rise with an increase in the amount of personal information. The personal information such as address, family make-up, and the like changes with the lapse of time. Unless a change notification or the like is received from the individual, freshness of the information once obtained cannot be maintained. The effort required to obtain such a change notification is large, and maintenance and management are troublesome. For the consumer, each time he receives different services, the same contents such as address, name, and the like have to be repetitively provided, i.e., many times. There is also information which cannot be known, such as birthdays of the consumer's family members, unless it is newly confirmed. Further, there is also information which the consumer prefers not to directly state or does not desire to be known. Therefore, the personal information is not sufficiently provided to the transaction, partner and there is also a possibility that the consumer will not receive expected services.

SUMMARY OF THE INVENTION

According to the invention, there is provided a personal information management system in which characteristics of a card having therein a processor and a memory are utilized and a consumer himself registers and manages personal information of the card with the initiative, so that freshness of the personal information is maintained, a privacy can be also protected, and further, proper services which the consumer desires can be expected.

The personal information management system of the invention comprises: a terminal device for registration for allowing a consumer to register and update personal information to a card having therein an integrated circuit including a processor and a memory; and a service providing apparatus according to the personal information read out from the card. It is a feature of the personal information management system of the invention that the registration and updating of the personal information to the card are not executed by a service providing company but by the consumer himself who received the card issue. Therefore, it is sufficient that the service providing company merely issues the card in which, for example, fundamental information such as member number, name, and the like have been recorded and all of the registration and updating of the personal information are entrusted to the consumer. A load and costs of the service providing company regarding the getting and management of the personal information can be remarkably reduced. If there is a change in address or the like, the consumer himself updates the personal information corresponding to the change. Thus, the freshness of the personal information is always maintained and the service providing company can receive the presentation of the information in which the freshness is maintained without substantially bearing a load to maintain the freshness. The card which is issued by a service providing apparatus is an IC card that is used for an electronic money transaction of a bank system. The company having the service providing apparatus issues the IC card to the consumer. When the service providing company joins to credit services, a credit company which provides the credit services issues the card to the consumer. By using the IC card for bank as a card for registration of personal information, an application of the IC card for bank which is widespread by providing a lending region is not limited to a mere bank transaction but can be used as a data bank of all of systems such as reservation system, member system, and the like which exist in the world and need personal information, thereby promoting a sudden spread of the IC card for bank. At the same time, the service providing company as an issuing source can obtain an advantage such that the selection of payment of a value for the services provided in accordance with the personal information in the IC card can be automatically performed. The consumer himself registers the personal information such as information regarding his own attributes, information about a hobby, information concerning a taste, and the like into the card. In this case, as own attribute information, fundamental information such as address, name, age, birthday, telephone number, etc. is registered. Further, health management information such as height, weight, chest circumference, visual power, blood pressure, etc., family information such as family make-up, birthday, wedding anniversary, etc., and further, economy information such as annual income, place of employment, resident type, etc. are registered as necessary. The personal information is registered into the card in accordance with the kind of service providing system. The card has a disclosure flag to decide the presence or absence of disclosure in association with each personal information. The service providing apparatus provides only the service according to the personal information in which the disclosure flag has been set. The card refers to the disclosure flag when the personal information is requested from the service providing system, provides only the personal information in which the disclosure flag has been set, and doesn't provide the personal information when the disclosure flag is reset. By the disclosure flag, the consumer can freely decide the information which he wants to disclose and the information which he doesn't desire to disclose. A terminal device for registration registers a priority in association with the personal information. The service providing apparatus provides the services according to the priority of the personal information. By giving the priorities to the personal information to be provided when the services are received as mentioned above, the services of the expected contents can be received. Further, in the terminal device for registration, when the services according to the priority of the personal information cannot be provided, minimum admitting conditions which can be accepted are registered. In response to them, the service providing apparatus refers to the minimum admitting conditions and provides services of conditions lower than the registered priority when the services according to the priority cannot be provided. Thus, for example, in the use of the personal information in the reservation system, the presentation of high flexible services can be expected. As minimum admitting conditions in the terminal device for registration, an allowable error time for a request time of the services to be provided is further registered. In this case, when the services which satisfy the request time cannot be provided, the service providing apparatus provides the services within the error time. For example, when the reservation system gives a priority to the use time of the public transport and provides such a use time as personal information, even if there is no relevant use time, by setting the error time as minimum admitting conditions to, for example, 30 minutes, a reservation time within 30 minutes before and after the desired time can be assured. Further, a rewrite flag to control the presence or absence of a rewriting of the card by the third party can be also provided in association with the personal information. By setting the rewrite flag, when it is necessary to update the personal information at the time of presentation of the services, the personal information of the card can be rewritten in the service providing apparatus.

The above and other objects, features, and advantages of the present invention will become more apparent from the following detailed description with reference to the drawings.

BRIEF DESCRIPTION OF THE DRAWINGS

FIG. 5A–B are explanatory diagrams of a fundamental information file stored in the IC card of FIG. 4;

FIG. 7A–B are explanatory diagrams of a system information table of a reservation system of FIG. 6;

FIG. 8 is an explanatory diagram of a reservation system table in which a disclosure flag associated with FIG. 6 is set every company;

FIG. 9 is an explanatory diagram of membership club information table in FIG. 6;

FIG. 11 is an explanatory diagram of a facility management information table in FIG. 6;

FIG. 12 is an explanatory diagram of a member management information table in FIG. 6;

FIG. 13 is an explanatory diagram of a come-up service information table in FIG. 6;

FIG. 18 is an explanatory diagram of a fundamental information registration picture plane when a fundamental is selected in FIG. 16;

FIG. 20 is an explanatory diagram of a reservation system registration picture plane when a reservation is selected in FIG. 17;

DETAILED DESCRIPTION OF THE PREFERRED EMBODIMENT

Figure 1:
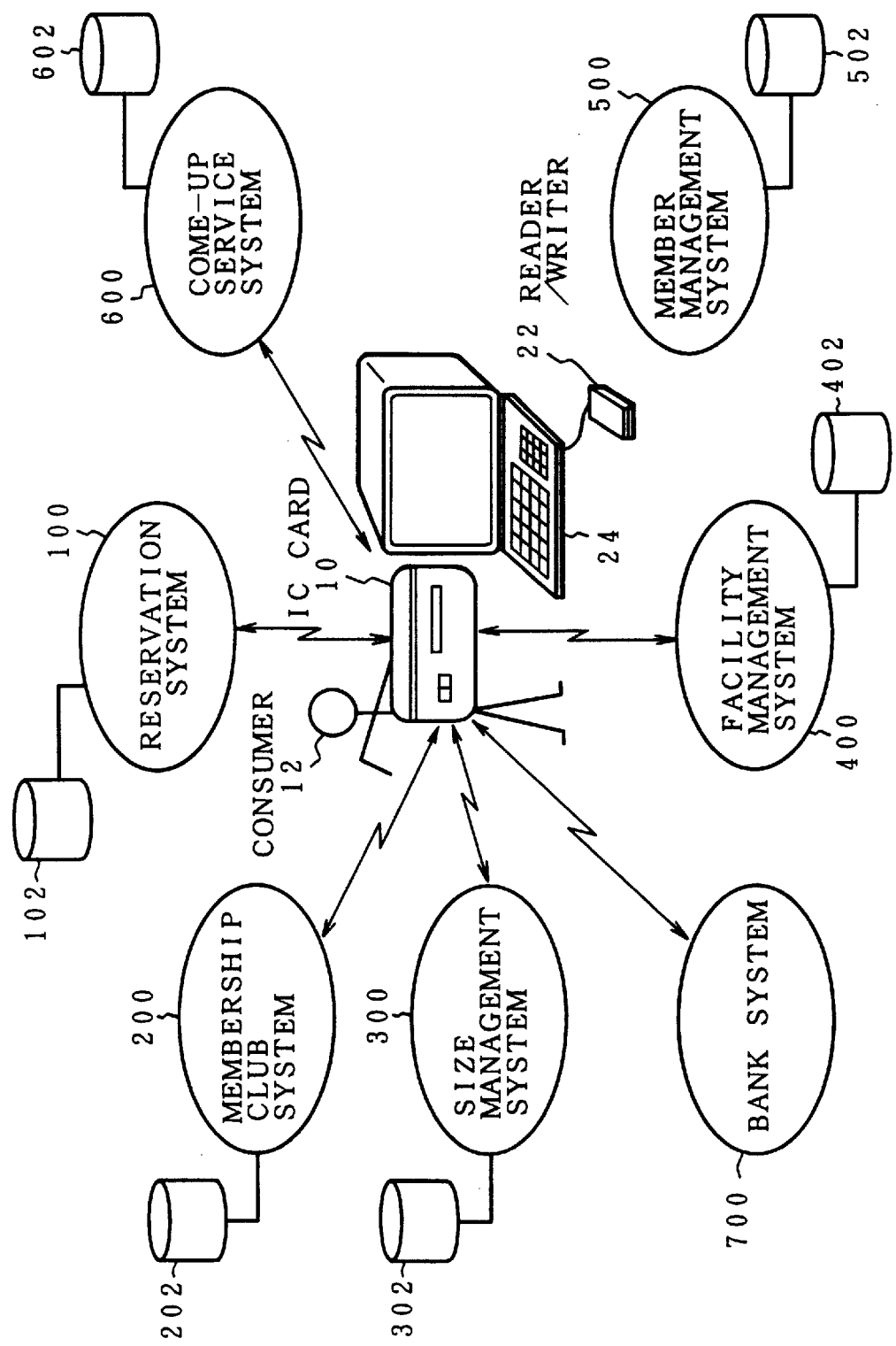
FIG. 1 is an explanatory diagram of a system configuration of the invention.

In a personal information management system of FIG. 1, in an example, a reservation system 100, a membership club system 200, a size management system 300, a facility management system 400, a member management system 500, and a come-up service system 600 are provided as various service environments surrounding a consumer 12. Further, a bank system 700 which is used by the consumer 12 is provided independent of the various service systems.

The consumer 12 uses an IC card 10 that is used in the bank system 700 and manages personal information which is necessary in the various service systems. In order to manage the personal information of the consumer himself by the IC card 10, the consumer 12 has a personal terminal 24 such as a personal computer or the like. A reader/writer 22 for the IC card 10 is provided as an option for the personal terminal 24. The personal terminal 24 in which the reader/writer 22 has already been installed in the personal computer main body can be also obviously used. The IC card 10 has a bank standard format used in the bank system 700 and registers and uses the personal information of the consumer 12 himself by using a lending region of the IC card. The IC card 10 can be issued by a bank having the bank system 700 or can be also issued by a company which treats the various service systems surrounding the consumer 12. Further, the IC card 10 can be also issued by a credit company of credit services which a service treating company joins.

An outline of the service systems in which the consumer 12 registers personal information into the IC card 10 and uses it will now be described. First, the reservation system 100 is a system which is provided by a public transport such as airline, train, or the like, a hotel, a theater, or the like. Further, the reservation system 100 includes a system to provide synthetic travelling services such as public transport, hotel, and the like as in a travelling company. A management file 102 is provided for the reservation system 100. Various information necessary for management and operation of the reservation system has been stored in the management file 102. The membership club system 200 is a member organization of consumer services which are sponsored by, for example, a department store. In the membership club, ordinarily, by joining the club, the consumer executes a reserving fund every month and, after completion of the reserving fund, a gift certificate or the like is returned to the member. A management file 202 in which information regarding the reserving fund of the member, return, continuation, and withdrawal from the membership has been stored is connected to the membership club system 200. The size management system 300 is a system for registering and managing sizes of consumer 12 when he purchases clothes, shoes, a ring, and the like. Various size information regarding the customer has been stored in the management file 302. Therefore, when the consumer examines the purchase of clothes or the like, by accessing to the size management system 300, the size information of the consumer himself is provided, thereby enabling the consumer to perform, for example, a selection or the like of goods suitable for the sizes. The facility management system 400 is a management system of, for instance, a parking lot or the like. Information regarding registration of vehicles has been registered in a management file 402. By using the IC card 10 at a gate of the parking lot, the gate is opened or closed and a fee is paid. The member management system 500 is, for example, a tennis class or a golf class sponsored by a department store or the like. Information such as year, month, and day of the entering of the member, a kind of member, a membership fee, a membership qualification period, and the like has been registered in a management file 502. Each time the consumer uses the membership club, information such as degree of skill, advice, and the like is updated as use information. In the come-up service system 600, information such as birthday of the customer, wedding anniversary, and the like has been recorded in a management file 602. The come-up service system 600 provides a service to automatically send a desired present or the like at a birthday or an anniversary day in accordance with a request of the customer. It will be obviously understood that FIG. 1 shows an example of the service systems in which the personal information registered in the IC card 10 of the invention is used. The invention also incorporates other arbitrary service systems which need the personal information. On the other hand, the bank system 700 is an inherent issuing source of the IC card 10. A bank standard format region is provided for the IC card 10. By setting the IC card 10 into a bank terminal such as counter terminal device, ATM, CD, or the like of the bank system 700, the bank system 700 accesses to a bank host computer and can execute all of bank transactions such as saving, withdrawal, transference, and the like using an account which the consumer 12 owns.

Figure 2:
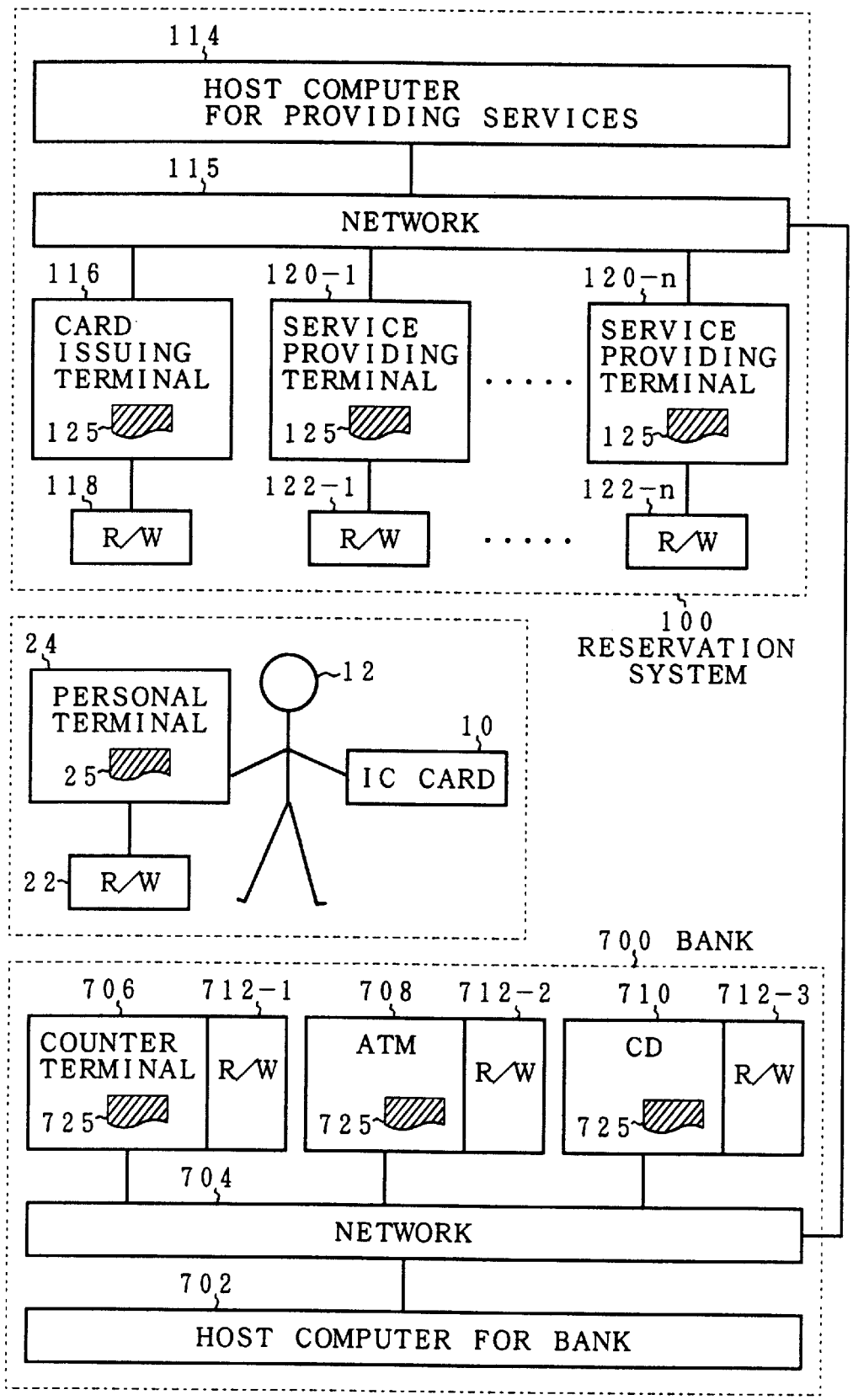
FIG. 2 is a block diagram of a system construction of the invention in case of a reservation system as an example.

FIG. 2 shows a construction of a personal information management system of the invention regarding the reservation system 100 of FIG. 1 as an example. First, a host computer 114 for providing services is provided on the reservation system 100 side serving as a service providing company. For example, a card issuing terminal 116 and a plurality of service providing terminals 120-1 to 120-n are connected to the host computer 114 through a network 115. Readers/writers 118 and 122-1 to 122-n of the IC card 10 are respectively connected to the card issuing terminal 116 and service providing terminals 120-1 to 120-n. The consumer 12 holds the IC card 10 issued by a company or bank treating the reservation system 100 and can register the personal information into the IC card 10 by using the personal terminal 24 such as a personal computer or the like. To enable the IC card 10 to be read or written, the reader/writer 22 is connected to the personal terminal 24. On the other hand, in the bank system 700, a counter terminal 706, an ATM 708, and further, a CD 710 are connected to a host computer 702 for bank through a network 704. Those equipment 706 to 710 have readers/writers (R/W) 712-1 to 712-3 which can cope with the IC card 10. In such a personal information management system of the invention using the IC card, in order to register the personal information to the IC card 10 by the consumer 12 himself, an agent 25 as a personal information registration program module which is provided as an application program has been installed in the personal terminal 24. An agent 125 having the same function as that of the agent 25 of the personal terminal 24 is also installed in each of the card issuing terminal 116 and service providing terminals 120-1 to 120-n of the reservation system 100. Similarly, a same agent 725 as the agent 25 installed in the personal terminal 24 is also installed in each of the counter terminal 706, ATM 708, and CD 710 of the bank system 700.

Figure 3:
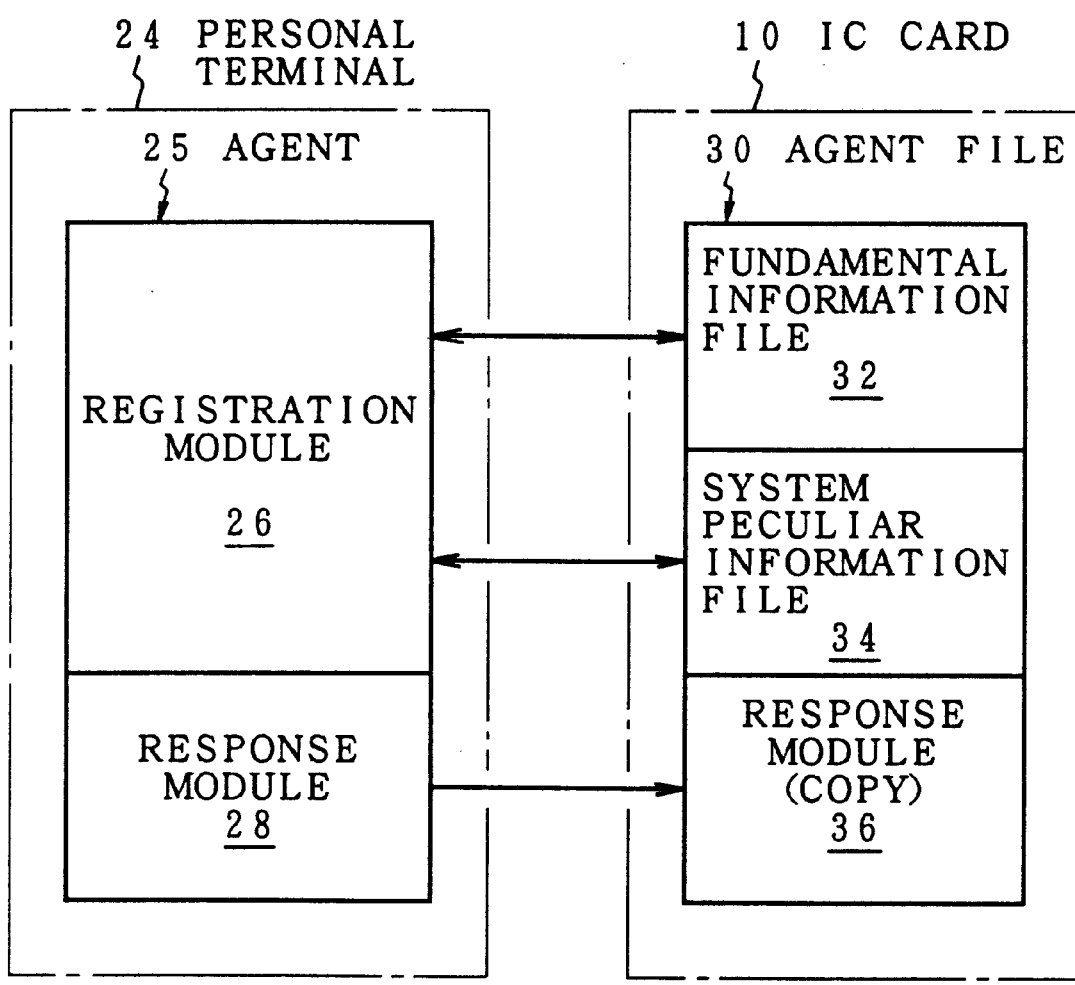
FIG. 3 is an explanatory diagram of a personal information management module installed in a consumer terminal in FIG. 2 and an IC card.

FIG. 3 shows the personal information management module "agent 25" according to the invention installed in the personal terminal 24 in FIG. 2 and a file structure on the IC card 10 side. The agent 25 as an application program for personal information management installed in the personal terminal 24 is constructed by a registration module 26 and a response module 28. By activating the agent 25 installed in the personal terminal 24, an agent file 30 is developed on the IC card 10 side. A fundamental information file 32, a system peculiar information file 34, and a response module 36 as a copy of the response module 28 of the agent 25 are developed in the agent file 30. The registration module 26 of the agent 25 installed in the personal terminal 24 has: a password registering function for registering a password which is necessary to register and update the personal information of the IC card 10; a personal information registering function for registering/updating the personal information into the IC card 10 by using the password; and a disclosure flag registering function to set a disclosure flag in association with the personal information to be disclosed on the IC card 10. The response module 28 has: a response processing function for outputting relevant information only when the disclosure flag has been set in response to an output request of the personal information for the IC card 10 from the outside which does not use the password; and a load processing function for loading the response processing unit as a response module 36 onto the IC card 10 at the time of the registration by the agent 25. The response module 36 loaded onto the IC card 10, therefore, has the same operation as that of the response function of the response module 28 in the agent 25. That is, in response to the output request of the personal information which does not use the password from the outside to the IC card 10, the disclosure flag of the requested personal information is referenced. When the disclosure flag has been set, the requested information is read out and outputted. When the disclosure flag has been reset, the requested information is not outputted.

Figure 4:
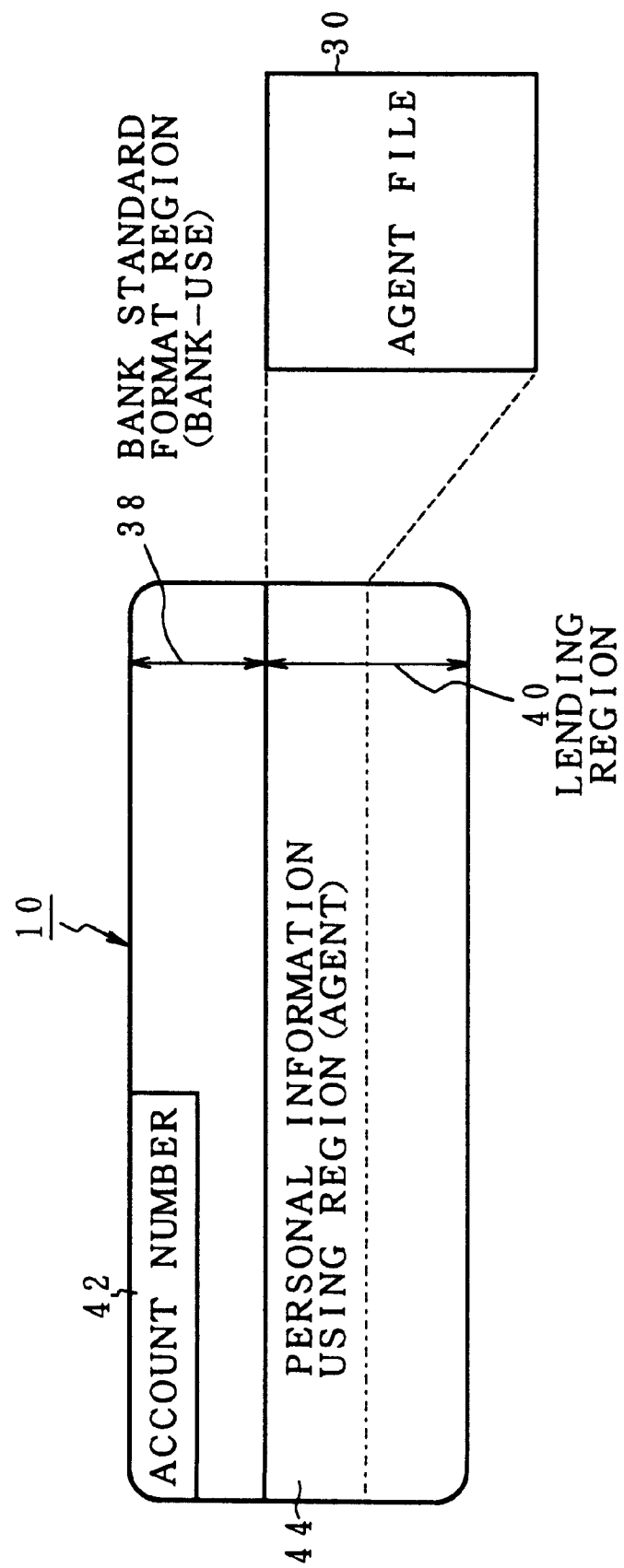
FIG. 4 is an explanatory diagram of an IC card which is used in the invention.

FIG. 4 is a diagram for explaining the IC card 10 issued to the consumer 12 in FIG. 2. The IC card 10 is a card medium for an information process and an information storage standardized by the bank and has an integrated circuit having therein at least a processor and a memory. By setting the IC card 10 into the counter terminal 706, ATM 708, or CD 710 provided for the bank system 700 in FIG. 2, a terminal provided for the card itself is connected to a terminal on the terminal device side, so that a power source is supplied to the IC card. At the same time, a transmission path is coupled, thereby enabling an ordinary bank transaction such as receipt of money, defrayal, savings, transference, or the like to be executed. With respect to a memory region of the IC card 10, the IC card has a lending region 40 for enabling the use by the third party to be performed in addition to a bank standard format region 38 which is used by the bank. At least an account number 42 has been stored in the bank standard format region 38 and the contents other than it conform with a predetermined bank standard format. In the personal information management system of the invention, a personal information using region 44 (agent region) 44 is allocated to the lending region 40 of the IC card 10 and is used. Namely, the agent file 30 comprising the fundamental information file 32, system peculiar information file 34, and response module 36 shown in FIG. 4 is stored in the personal information using region 44.

Figure 5B:
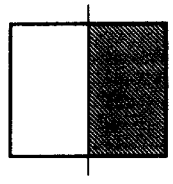

FIG. 5 shows a specific example of the fundamental information file 32 in the agent file 30 of the IC card 10 in FIG. 3. Fundamental information, health information, family information, work information, and the like shown in an item 16 are registered into the fundamental information file 32 as personal information of the consumer 12 himself. As fundamental information, for example, an address, a name, an age, a birthday, a sex, a telephone number, a birth place, a school career, and the like are registered. As health information, a height, a weight, a chest circumference, a visual power, a blood pressure, and the like are registered. As family information, a wife, one boy, one girl, a wedding anniversary, a birthday, and the like are registered. As work information, an annual income, a place of employment, a resident type, and the like are registered. It will be obviously understood that an attribute 18 of each item in the fundamental information file 32 in FIG. 5 is shown as an example and other proper fundamental information can be also registered as necessary. A registering region of a disclosure flag 20 is provided for the attribute 18 of each of the fundamental information, health information, family information, and work information in such an item 16. In the example, as for a disclosure flag 20, the disclosure flag can be registered individually for each of various kinds of service systems in FIG. 1. That is, the disclosure flag 20 is separately allocated to each of the reservation system, membership club system, size management system, facility management system, member management system, and come-up service system. The disclosure flag 20 can be set for every system with respect to each attribute. In the information registered as an attribute 18, the consumer distinguishes it into information to be disclosed to every service system and information which the consumer prefers not to disclose. With respect to the information which can be disclosed, the disclosure flag 20 is set to "1". With regard to the attribute which the consumer prefers not to disclose, the disclosure flag 20 is reset to "0". For example, in case of the disclosure flag 20 of the reservation system, the disclosure flag 20 has been set to "1" with respect to the attribute of each of the address, name, age, sex, and telephone number in the fundamental information. However, the disclosure flag 20 is reset to "0" with respect to the attribute about each of the birthday, birth place, and school career because they are the items which are not particularly necessary in the reservation system and those items are not disclosed. As for the health information, the disclosure flag 20 is set to "1" with respect to each attribute of the height, weight, and chest circumference as information necessary in the size management system and they are disclosed. As for the family information, in order to enable a present to be sent in the come-up service system, the disclosure flag 20 is set to "1" with respect to each attribute of the wife, one boy, one girl, wedding anniversary, and birthday. As for the registration of the attribute information of the fundamental information file 32 and the setting of the disclosure flags in the agent file 30 as mentioned above, the consumer 12 judges by himself and can freely perform those operations and is not restricted by a request from the service providing system side.

Figure 6:
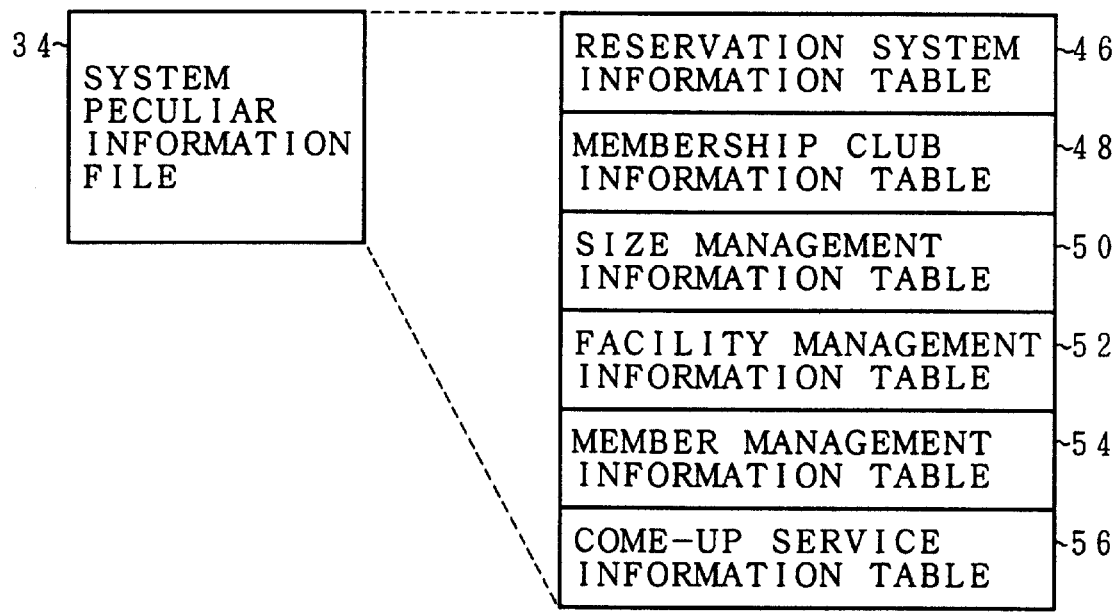
FIG. 6 is an explanatory diagram of a system peculiar information file stored in the IC card of FIG. 4.

FIG. 6 shows the system peculiar information file 34 in the agent file 30 provided for the IC card 10 in FIG. 4. The system peculiar information file 34 corresponds to the six service systems in FIG. 1 and is constructed by: a reservation system information table 46; a membership club information table 48; a size management information table 50; a facility management information table 52; a member management information table 54; and a come-up service information table 56.

Figure 7B:
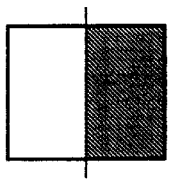

FIG. 7 shows an example of the reservation system information table 46 in FIG. 6. The reservation system information table 46 is constructed by: a system ID 58 indicative of the kind of service and a reservation; contents 60 of the reservation; an attribute 62 in each reservation content; a disclosure flag 64 of each attribute; a priority 66 of the attribute to be disclosed when making a reservation; and further minimum admitting conditions 68 when the service based on the attribute according to the priority 66 cannot be provided. In the example, an airline, a train, a hotel, and a theater are used as reservation contents 60. With respect to the airline in the reservation contents 60, six attributes of first, economy, non-smoking, window side, front, and upper limit charge are prepared as attribute information 62. In order to disclose each of those attribute information of the airline in response to an output request from the reservation system, the consumer 12 sets the disclosure flag 64 of the information when he wants to disclose to "1" and resets the disclosure flag 64 to "0" when there is no need to disclose. In the airline, in this case, by setting the disclosure flag 64 to "1" with respect to each of economy, non-smoking, window side, and front, thereby coping with an output request from the reservation system. The disclosure flag 64 is reset to "0" with respect to first which is out of the reservation target and upper limit charge in which the consumer prefers not to disclose the information, thereby inhibiting that they are disclosed in response to the output request from the reservation system. As for the attribute 62 whose disclosure flag 64 has been set to "1", the priority of the reservation which is desired by the consumer himself is set to <1>, <2>, or <3> into the priority 66 subsequent to the disclosure flag 64. Further, with respect to the minimum admitting conditions 68, minimum admitting conditions which can be admitted when the reservation which satisfies the conditions by the priority 66 is not obtained are registered. In the example, the lower limit priority is set to <2> and, further, the error time for the reservation time of the airline is set to 30 minutes as an admitting condition. Therefore, when the reservation according to the attribute 62 of the conditions <1> to <3> of the priority 66 cannot be retrieved the condition is lowered to the minimum admitting conditions 68 and the relevant reservation is retrieved. A dynamic reservation retrieval is enabled while providing a flexibility for the retrieval of the reservation. With respect to the train of the reservation contents 60, Nozomi, Hikari, and Kodama are registered as an attribute 62 for a "Shinkansen" as a target. Further, green seat, unreserved seat, reserved seat, non-smoking, and window side are set and, as necessary, berth can be also set as attribute information. In this case as well, by setting the disclosure flag 64 to "1" with respect to the desired attribute, the attribute information whose disclosure flag 64 has been set to "1" can be replied to an output request of the attribute information from the reservation system. With respect to the priority 66, the priorities are set to <1> to <5>. Further, the lower limit priority <4> and the error time of 60 minutes for the reservation time are set as minimum admitting conditions 68. As for the hotel in the reservation contents 60, single, double, twin, connect, suite, and upper limit charge have been registered as attributes 62. In this case, the disclosure flag 64 is set to "1" with respect to each of the single, double, twin, and upper limit charge. The disclosure flags 64 about the other items are reset to "0". The priority is registered to <1> to <4> with respect to the attribute whose disclosure flag 64 has been set to "1". Further, the minimum admitting conditions are set to the lower limit priority <3>. With regard to the theater in the reservation contents 60, S seat, A seat, others, right side, center, left side, and upper limit charge have been registered as attributes 62. In order to disclose at the time of the reservation, the disclosure flags 64 of the other items are set to "1". The priority 66 is set to <1> to <6> and the minimum admitting conditions 68 are set to the lower limit priority <4>. It will be obviously understood that the reservation system information table 46 in FIG. 7 is shown as an example. Necessary information regarding the proper contents 60 and attributes 62 can be also registered as necessary.

FIG. 8 is a table associated with the reservation system information table 46 in FIG. 7. The table is characterized in that the disclosure flags 64 can be individually set per service providing company. FIG. 8 shows the table of the airline in the reservation contents 60 in FIG. 7 as an example. The disclosure flags 64 can be separately set every airline company ANA, JAL, JAS, or others with respect to each attribute 62. Since the disclosure flags can be freely changed in accordance with the service providing company as mentioned above, a desired reservation can be optimized.

FIG. 9 shows an example of the membership club information table 48 in the system peculiar information file 34 in FIG. 6. As attributes 62 subsequent to the system ID 58 indicative of the membership club, a gift certificate as goods to be returned, an invitation ticket, a discount ticket, an information card, and the like have been registered in the membership club information table 48. For such return attributes 62, in this case, since the consumer wants to obtain all of the return attributes, the disclosure flags 64 about all of the attributes 62 are set to "1". With respect to the priority 66, the priorities <1> to <4> are set in accordance with the priorities at which the consumer wants to receive the return of goods.

Figure 10A:
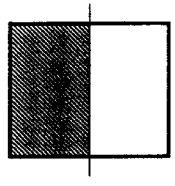
FIG. 10A–B are explanatory diagrams of a size management information table in FIG. 6.
Figure 10B:
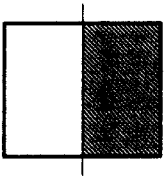

FIG. 10 shows an example of the size management information table 50 in the system peculiar information file 34 in FIG. 6. In the size management information table 50, subsequent to the system ID 58 indicative of the size management, suits, a shirt, and shoes are shown as examples in the contents 60. For example, as for the suits in the size management contents 60, size, single, double, formal, business, casual, color, and upper limit charge have been registered as attributes 62. With respect to such attributes 62 about the suits, it is sufficient for the consumer to set the disclosure flags 64 about the attributes to be provided into "1" and to reset the disclosure flags 64 about the attributes which he doesn't want to disclose into "0" in response to an output request from the size information management system. As for the priority 66, for example, the priorities <1> to <6> are set with respect to the attributes 62 whose disclosure flags 64 have been set to "1" and the priority of the provided attribute information is given to the size information management system, thereby enabling his desired result to be obtained by the selection of the suits. Further, in the size information management system, there is a case where when goods are purchased, the table registration attributes of the IC card 10 at that time differ from the actual purchase result. Therefore, a rewrite flag 72 is provided in order to permit the personal information of the IC card 10 to be rewritten by the size information management system side. By setting the rewrite flag 72 to "1", the attributes 62 can be rewritten by the using terminal of the size information management system. Namely, in the personal information management system of the invention, among the attribute information registered in the IC card 10, the rewriting of the attribute information whose rewriting by the third party is permitted can be allowed by setting their rewrite flags 72. Further, as minimum admitting conditions 68, the lower limit priority <4> is set as for the suits. With respect to the next shirt and shoes in the contents 60 as well, the information peculiar to the attributes 62 is registered, thereby enabling them to be disclosed by setting the disclosure flags 64 into "1". Further, the priorities 66, rewrite flags 72, and admitting conditions 68 are set.

FIG. 11 shows an example of the facility management information table 52 in the system peculiar information file 34 in FIG. 6 and relates to an example of a management of a parking lot. Subsequent to the system ID 58 indicative of the facility management, in the facility management information table 52, a vehicle is registered as a management content 60, a type of vehicle, a number, an ownership, and a color are registered as attributes 62 of the vehicle, cash to settle the use fee and a payment attribute of credit are registered, and further the number of use times is registered as attribute information. For such attributes 62, for example, the disclosure flags 64 about the vehicle type, number, cash, and number of use times are set to "1" and the disclosure flags 64 of the other items are reset to "0". It will be obviously understood that the facility management information table 52 is not limited to the example of FIG. 11 for the parking lot as a target but can be also applied to another proper facility management system.

FIG. 12 shows an example of the member management information table 54 in the system peculiar information file 34 in FIG. 6. In the member management information table 54, subsequent to the system ID 58 indicative of the member management system, for example, a tennis class and a golf class are registered as contents 60 of the member management system. With respect to each of the tennis class and the golf class, beginner, intermediate, advanced, and the number of years have been registered as attributes 62. In accordance with the present situation, the consumer sets the disclosure flags 64 for the intermediate and the number of years into "1" like a disclosure flag 64 of the tennis class, for example, and resets the disclosure flags 64 for the beginner and advanced which are not concerned into "0".

FIG. 13 shows an example of the come-up service information table 56 in the system peculiar information file 34 in FIG. 6. Subsequent to the system ID indicative of the come-up, a birthday, a wedding anniversary, mother's day, a death anniversary, and the like have been registered as service contents 60 into the come-up service information table 56. With respect to the next attributes 62, for example, as for the birthday, a wife, one boy, one girl, father, mother, father-in-law, and mother-in-law have been registered and all of the disclosure flags 64 are set to "1" because the come-up services for all of the attributes are provided. With respect to the wedding anniversary in the contents 60 of the come-up services, an annual anniversary, 5th year, 10th year, 15th year, 20th year, and 25th year are registered as attribute information in the attributes 62. In this case as well, the disclosure flags 64 about all of the attribute information are set to "1". Further, as for the mother's day in the contents 60 of the come-up service, a mother and a mother-in-law are registered as attributes 62 and their disclosure flags 64 are set to "1". On the other hand, with regard to the death anniversary, as personal information, although a grand father and a grand mother are registered as attributes 62, since the consumer doesn't want to disclose those information to the outside, their disclosure flags 64 are reset to "0".

As mentioned above, the personal information regarding the attributes which are needed in each service system is registered into the information table of the contents corresponding to various service systems in the system peculiar information file 34 in FIG. 6. The disclosure flag to decide the presence or absence of the disclosure is set or reset in response to the output request from the system. Further, a priority is allocated to the attribute to be disclosed in order to clarify the service which the consumer wants to receive. Moreover, by predicting a situation such that the services according to the priority cannot be provided and by previously registering the minimum admitting conditions of the services which can be accepted, the consumer can receive services of a higher flexibility.

Figure 14:
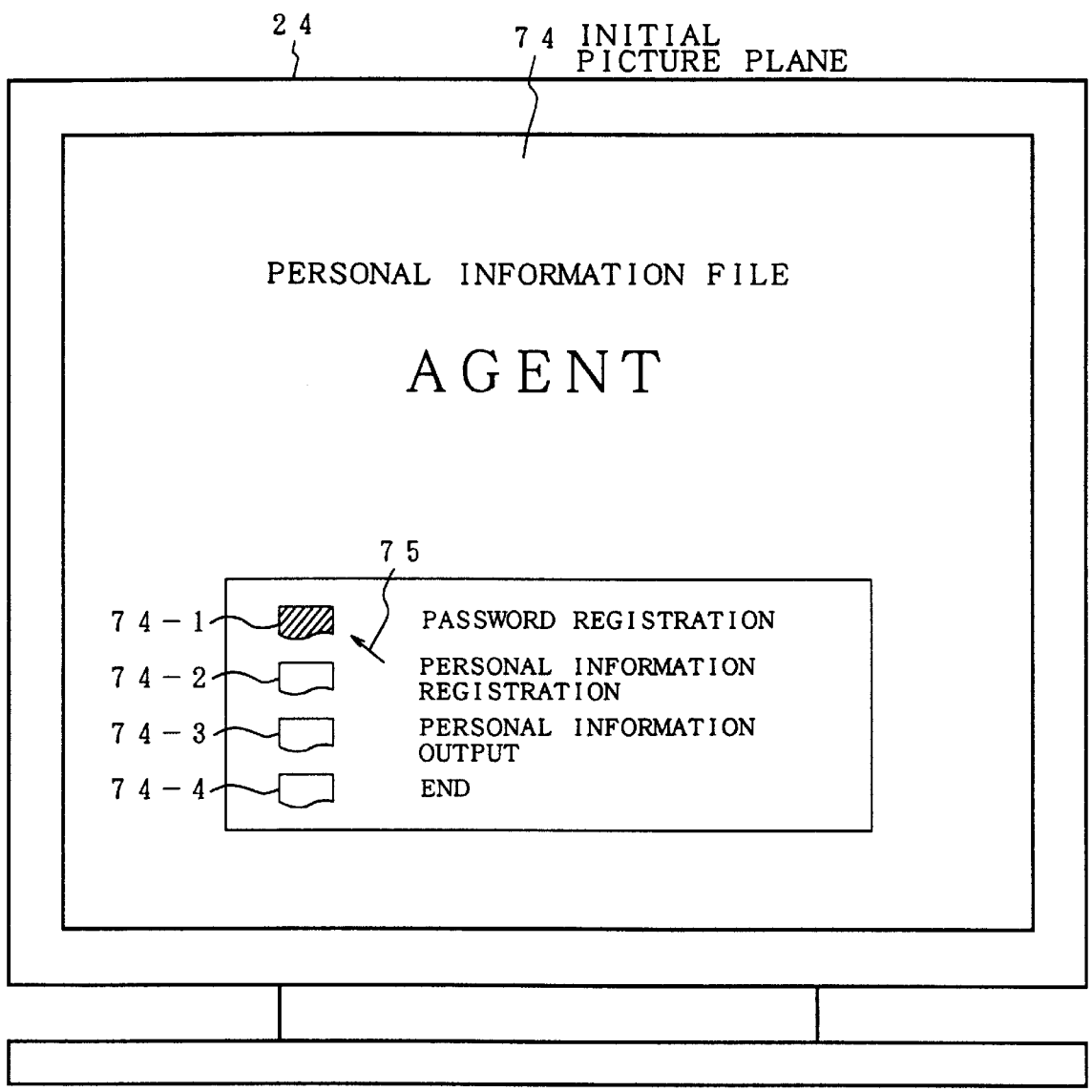
FIG. 14 is an explanatory diagram of an initial picture plane at the time of registration in a consumer terminal in FIG. 1.
Figure 15:
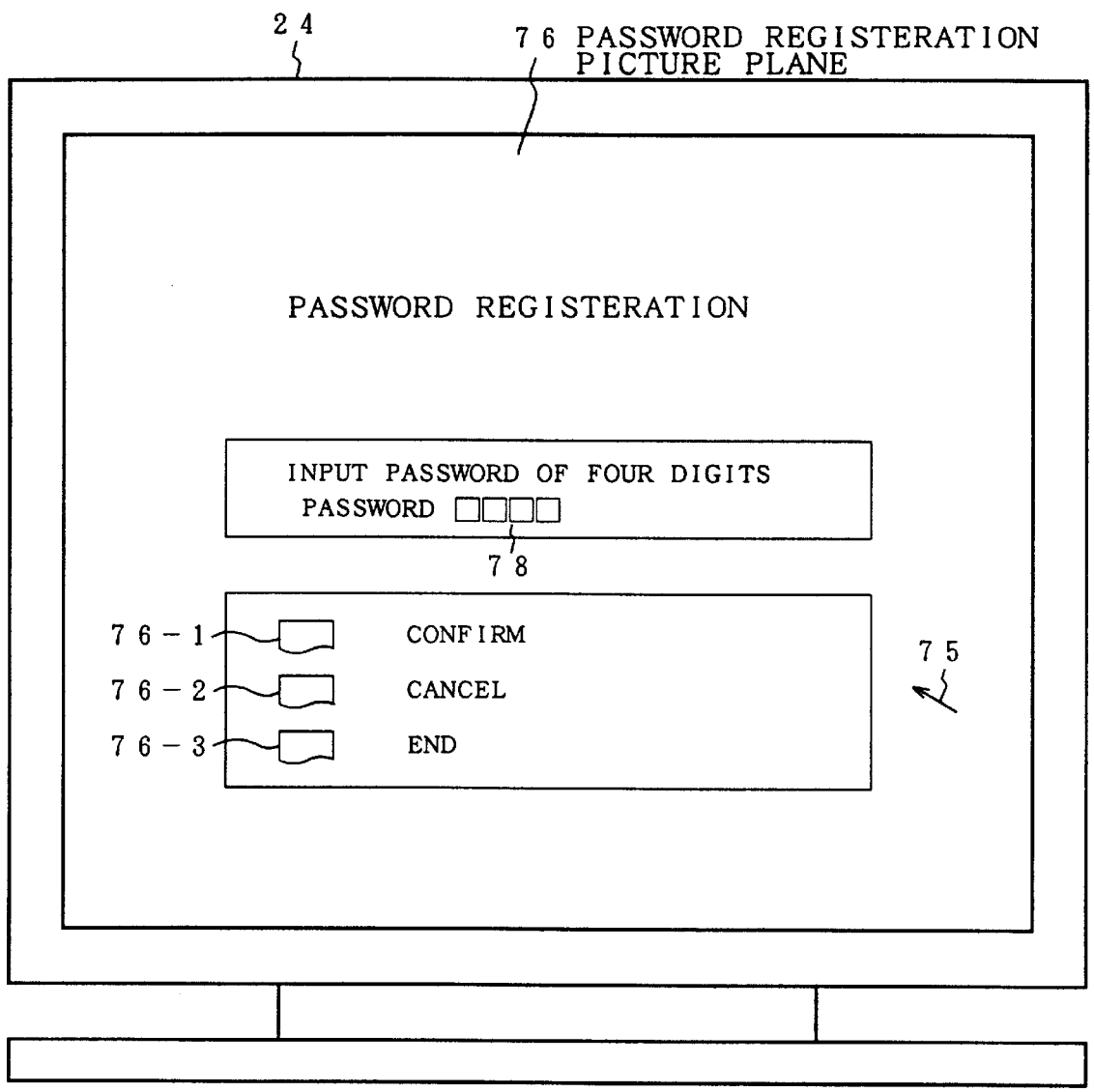
FIG. 15 is an explanatory diagram of a password registration picture plane when a password registration is selected in FIG. 14.

The operations for registering, updating, and outputting the personal information for the IC card 10 using the agent 25 that is installed into the personal terminal 24 in FIG. 3 will now be described in detail. FIG. 14 shows an initial picture plane 74 of the personal terminal 24 in which the agent 25 as an application program to realize a personal information management according to the invention has been installed. "Personal information file AGENT" indicative of an application name is displayed on the initial picture plane 74. Operation symbols of a password registration 74-1, a personal information registration 74-2, a personal information output 74-3, and an end 74-4 are displayed in a frame under the application name. The first process after the agent 25 in FIG. 3 was installed into the personal terminal 24 is the registration of a password. Therefore, by moving a mouse cursor 75 to the operation symbol of the password registration 74-1 and by clicking a mouse, the screen is switched to a password registration picture plane 76 in FIG. 15. The password registration picture plane 76 requests, for example, an input of a password of four digits for a password input frame 78. Therefore, the consumer 12 sets, for example, a password consisting of peculiar numerals of four digits into the password input frame 78 and clicks an operation symbol for confirmation 76-1 by the mouse cursor 75, thereby registering the password. The password is registered for both of the agent 25 installed in the personal terminal 24 in FIG. 3 and the agent file 30 of the IC card 10.

Figure 16:
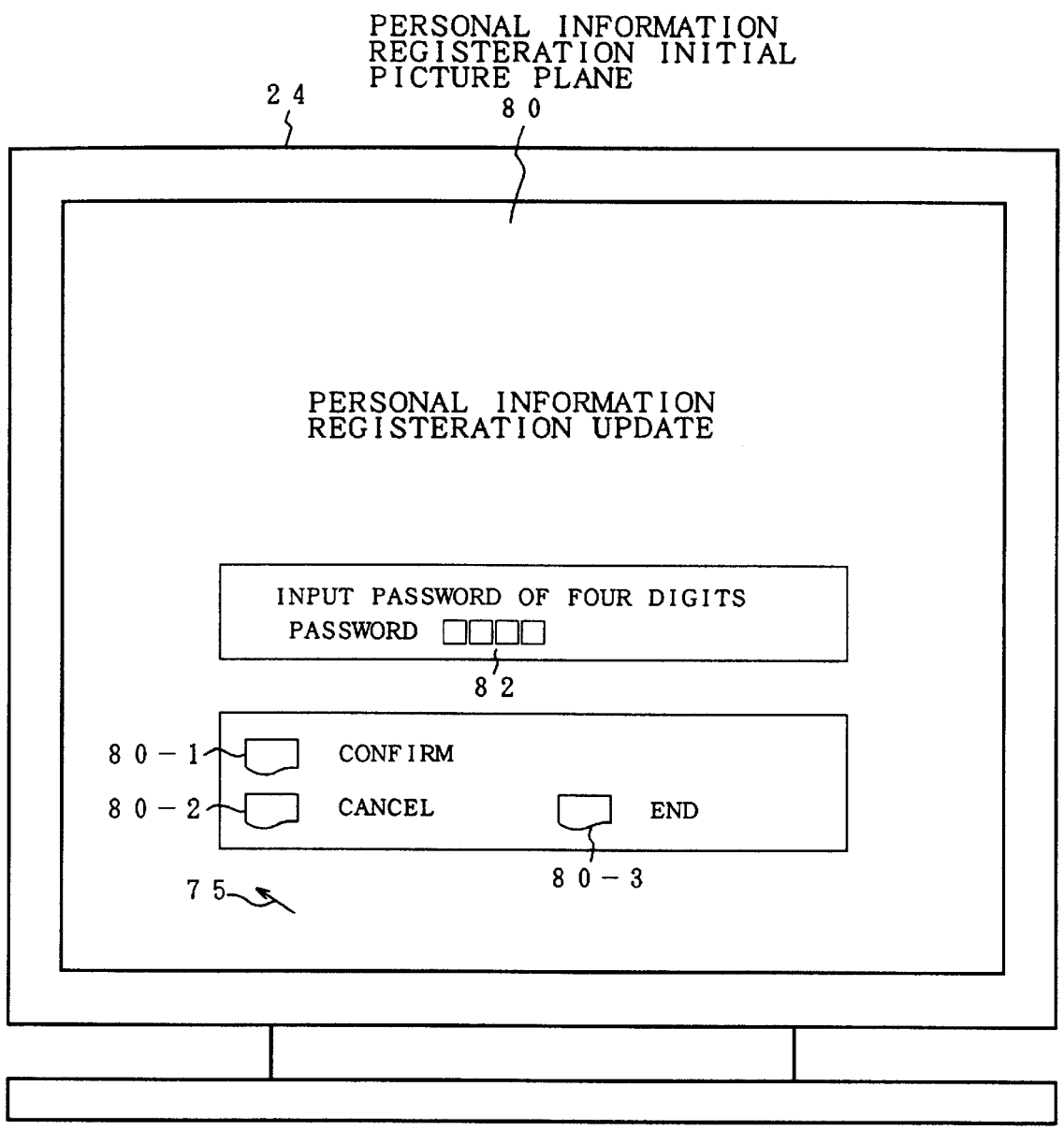
FIG. 16 is an explanatory diagram of a password registration picture plane when personal information registration is selected in FIG. 14.
Figure 19:
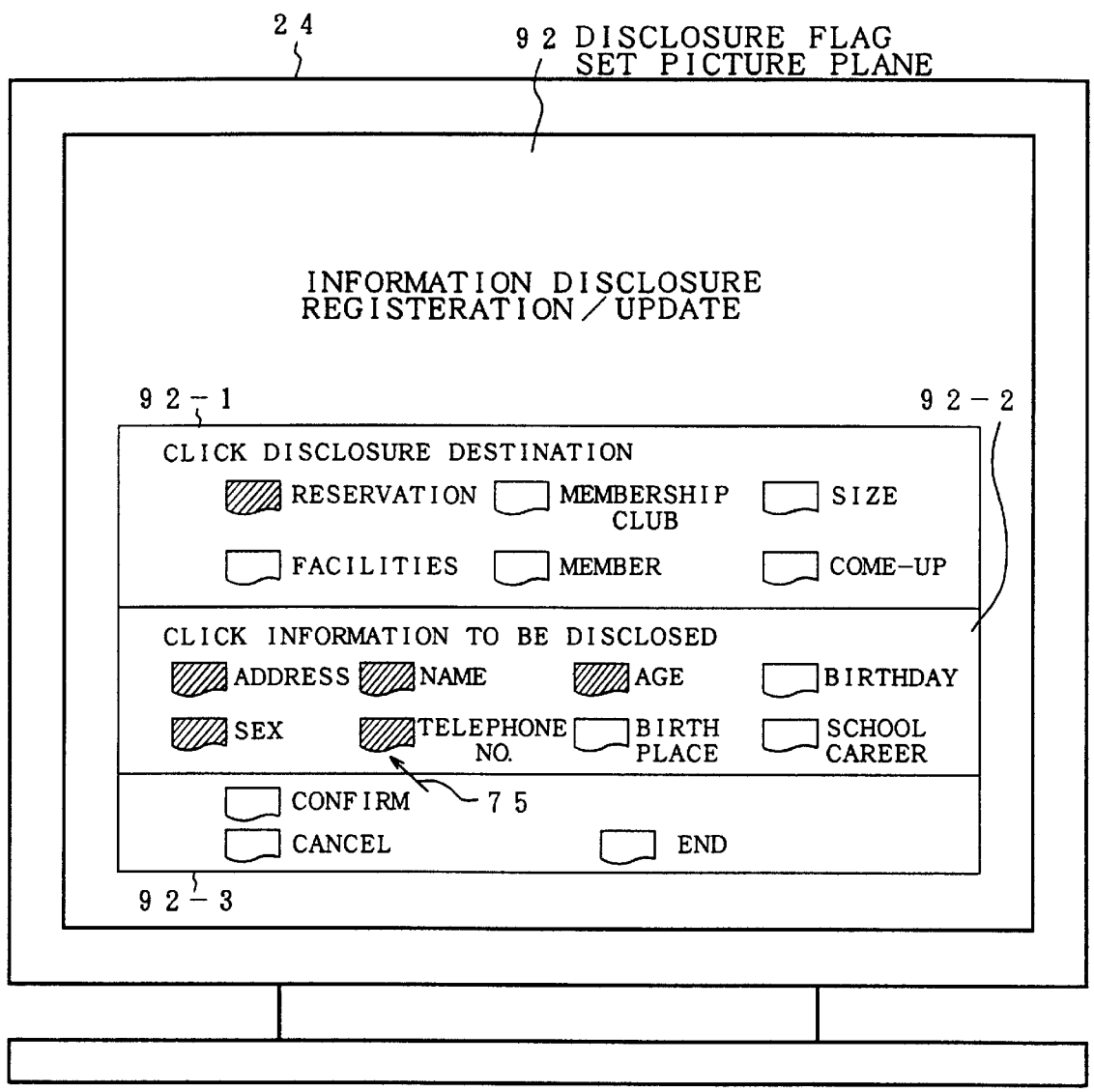
FIG. 19 is an explanatory diagram of a disclosure flag set picture plane which is displayed subsequent to a registration in FIG. 18.

After completion of the registration by the password registration picture plane 76 in FIG. 15, the screen is again returned to the initial picture plane 74 of FIG. 14. Therefore, by subsequently moving the mouse cursor 75 to the operation symbol and by clicking the mouse for the purpose of the personal information registration 74-2, the screen is switched to a personal information registration initial picture plane 80 of FIG. 16. In the personal information registration initial picture plane 80, first, the password of four digits is inputted to a password input frame 78. When the password is correct, the operation symbol for confirmation 80-1 is clicked by the mouse cursor 75. Thus, the screen is switched to a registration menu picture plane 82 of FIG. 17. The registration menu picture plane 82 can be used for both of the registration and the updating. The registration menu picture plane 82 is divided into fundamental information 84 and system information 86. Operation symbols of fundamental 84-1, health 84-2, family 84-3, and work 84-4 corresponding to the contents of the fundamental information file 32 in FIG. 5 are displayed in the fundamental information 84. Six operation symbols of reservation 86-1, membership club 86-2, size 86-3, facilities 86-4, member 86-5, and come-up 86-6 shown in the contents in the system peculiar information file 34 in FIG. 6 are displayed in the system information 86. First, the operation symbol of fundamental 84-1 in the fundamental information 84 is clicked by the mouse cursor 75. By such a clicking operation, the screen is switched to a fundamental information registration picture plane 90 of FIG. 18. The fundamental information registration picture plane 90 has attribute input frames of an address 90-1, a name 90-2, an age 90-3, a male 90-4, a female 90-5, a birthday 90-6, a telephone number 90-7, a birth place 90-8, and a school career 90-10. The consumer himself, therefore, registers all of the fundamental information or fundamental information which is considered to be necessary by using the fundamental information registration picture plane 90. When the registration contents are confirmed, by mouse clicking a confirmation operation symbol provided in an operating region 90-11, the screen is switched to a disclosure flag set picture plane 92 of FIG. 19. The disclosure flag set picture plane 92 is constructed by a disclosure destination region 92-1, a disclosure flag set region 92-2, and a control symbol region 92-3. First, with respect to the disclosure destination region 92-1, for example, a reservation operation symbol in the disclosure destination region 92-1 is mouse clicked. Subsequently, an operation symbol of an attribute to be disclosed in the disclosure flag set region 92-2 is mouse clicked. For example, when the reservation is mouse clicked and inverted as a disclosure destination as shown by a hatched region, by mouse clicking five regions of address, name, age, sex, and telephone with respect to the disclosure flag set region and by inverting them as shown by hatched regions, the disclosure flags can be set to "1". By such a setting of the disclosure flags, as for the attribute 18 in the fundamental of the item 16 shown in the fundamental information file 32 in FIG. 5, the disclosure flag 20 of the corresponding portion of the reservation system can be set to "1". When the disclosure flag can be set to "1", by mouse clicking a confirmation symbol in the control symbol region 92-3, the registration of the fundamental information and the setting of the disclosure flags for the IC card 10 are executed. In a manner similar to the above, it is sufficient to similarly set the disclosure flags with respect to the systems of membership club, size, facilities, member, and come-up by using the same disclosure flag set picture plane 92.

Figure 17:
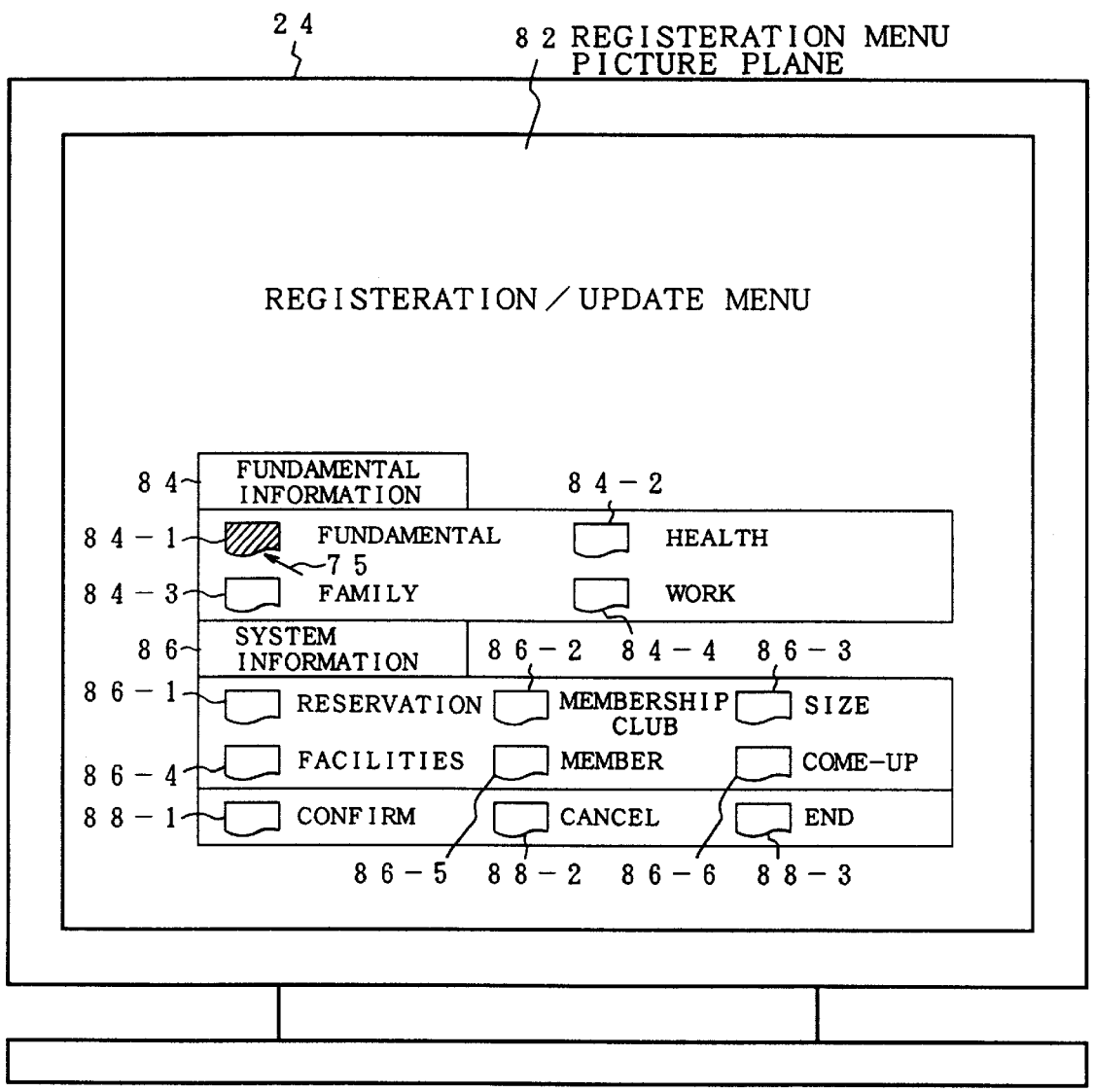
FIG. 17 is an explanatory diagram of a registration menu picture plane when a password is inputted in FIG. 16.

FIG. 20 shows a reservation system registration picture plane 94 when the operation symbol of the reservation 86-1 of the system information 86 in the registration menu picture plane 82 of FIG. 17 is mouse clicked. In the reservation system registration picture plane 94, a registration picture plane of the airline in the reservation contents 60 in FIG. 7 is shown as an example and first, economy, non-smoking seat, window side, front, and upper limit charge are displayed as attribute information 94-1. Therefore, for the necessary attribute, namely, the output request, it is sufficient to mouse click the operation symbol on the right side with regard to the attribute to be disclosed. As for the upper limit charge, an amount of upper limit charge is inputted. With regard to the upper limit charge, it is sufficient to click and turn on an operation symbol of the disclosure flag provided separately as necessary. Further, a priority input frame to set priorities is displayed on the left side of first, economy, non-smoking seat, window side, front, and upper limit charge. It is sufficient to input a numeral indicative of the priority into the priority input frame. An input frame of a priority lower limit and a delay time is also provided as admitting conditions. After completion of the input for the necessary registration, by mouse clicking a confirmation symbol in a control symbol region 94-2, the registration to the IC card 10 is executed.

Figure 21:
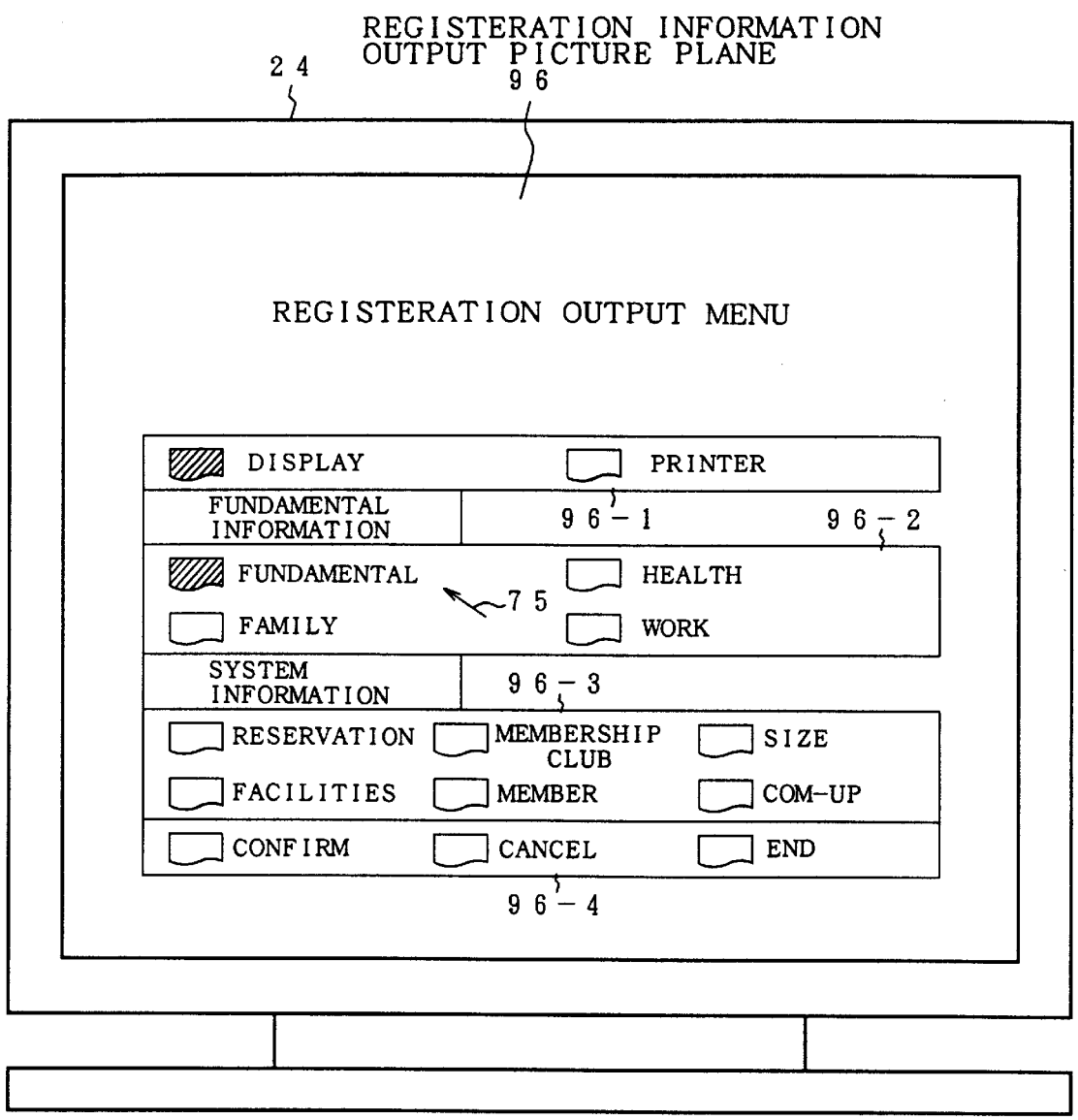
FIG. 21 is an explanatory diagram of a registration information output picture plane when a personal information output is selected in FIG. 14.

FIG. 21 shows a registration information output picture plane 96 which is switched by clicking an operation symbol of the personal information output 74-3 by the mouse cursor 75 in the initial picture plane 74 of FIG. 14. In the registration information output picture plane 96, an output destination is designated to either one of a display and a printer by an output equipment designating region 96-1. As for a next fundamental information region 96-2, the necessary output information among fundamental, health, family, and work which are the items divided as fundamental information is mouse clicked. Further, as for a system information region 96-3, since operation symbols of the six systems of reservation, membership club, size, facilities, member, and come-up are displayed, the symbol of the system to be outputted is mouse clicked. After the above output conditions were set, by mouse clicking a confirmation symbol in a control operating region 96-4, a process for outputting the designated registration information to the display or printer designated as an output destination is executed.

Figure 22:
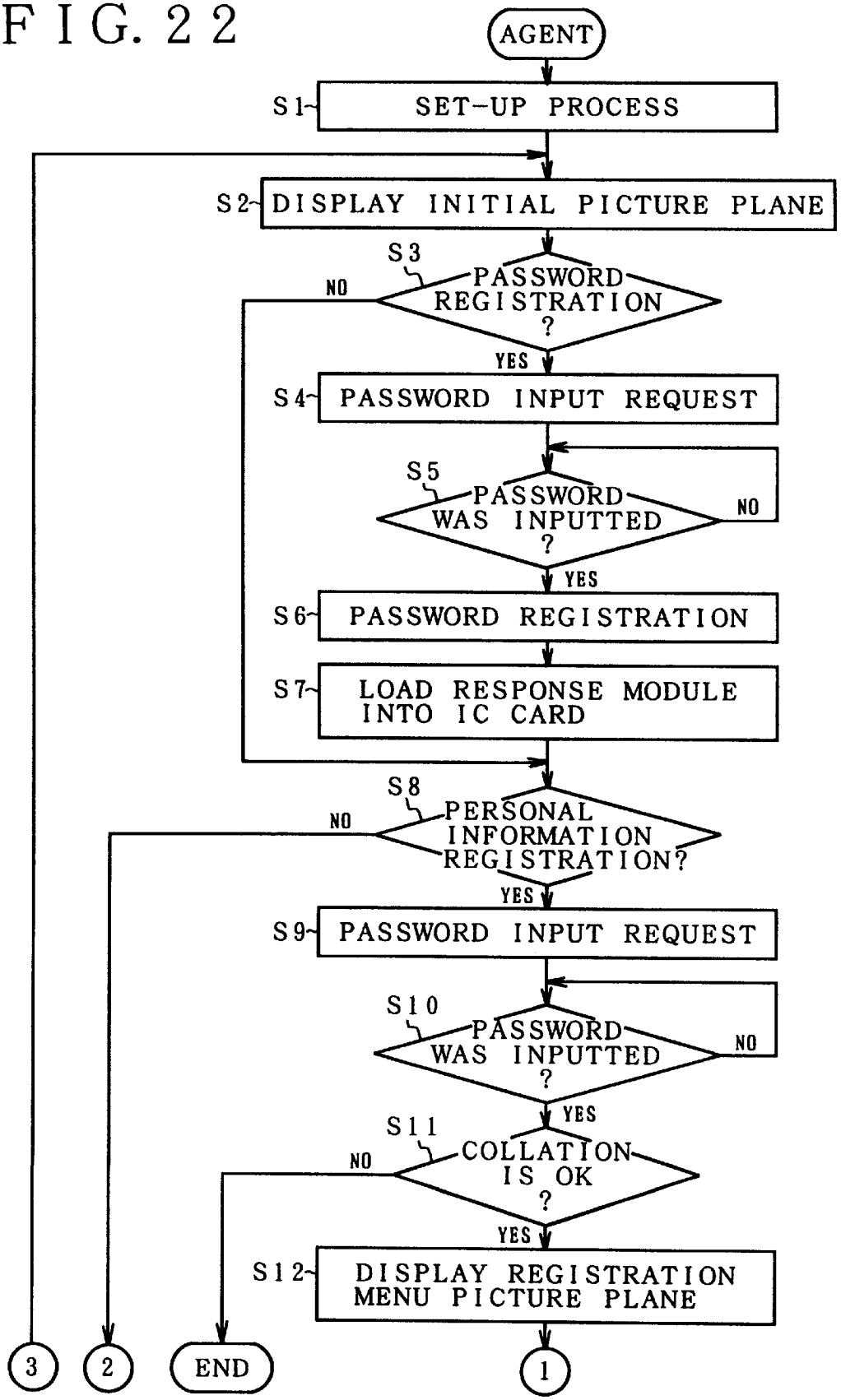
FIG. 22 is a flowchart for a registering process by an agent in FIG. 3.
Figure 23:
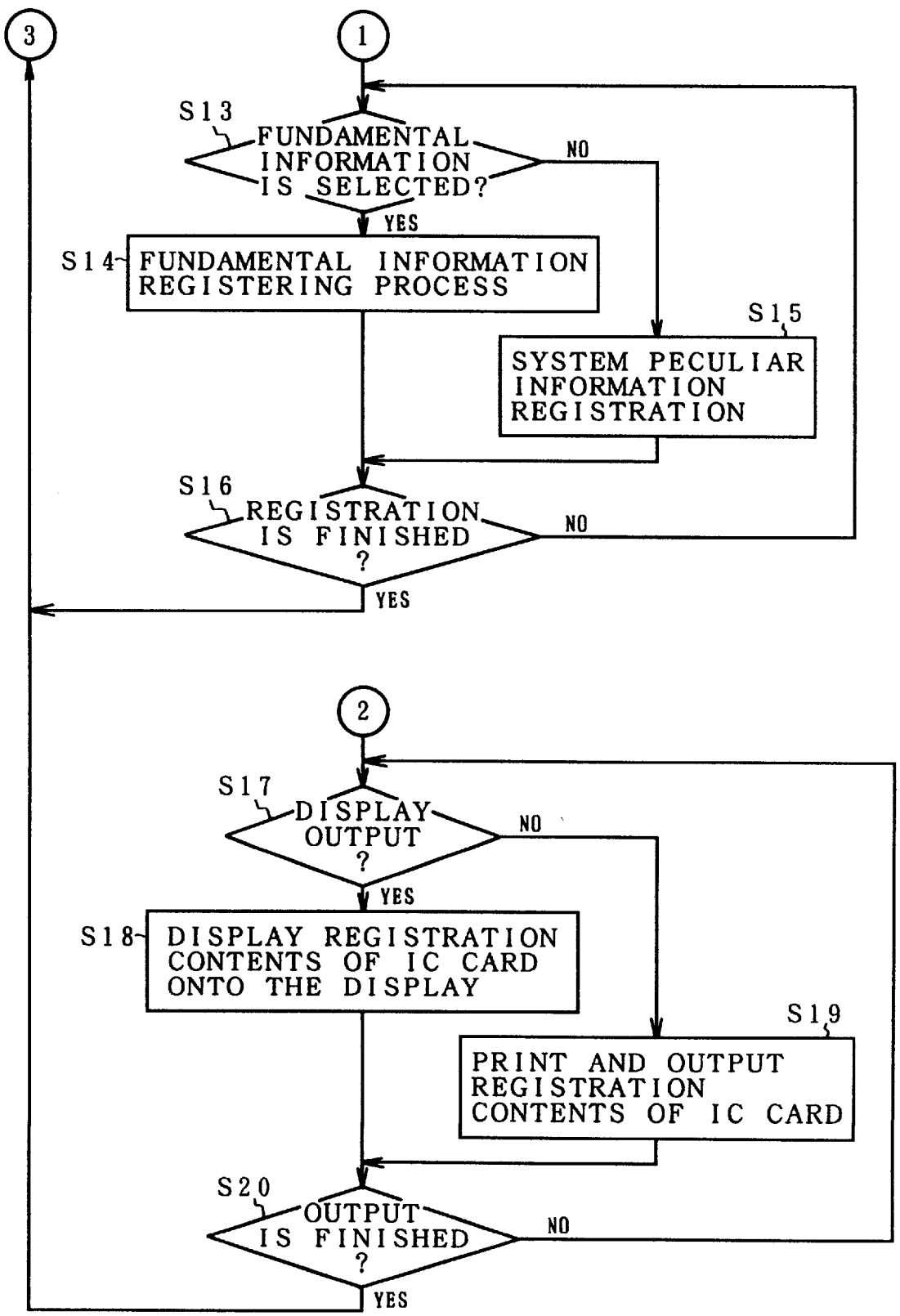
FIG. 23 is a flowchart for the registering process by the agent subsequent to FIG. 22.

A flowchart of FIG. 22 relates to a processing operation of the agent 25 installed in the personal terminal 24 in FIG. 3. Such a processing operation is executed in association with the display of the operation picture planes of FIGS. 14 to 21. First in step S1, a set-up process for installing the agent 25 as an application program which is provided by a medium such as floppy, CD, or the like into the personal terminal 24 is executed. After completion of the set-up process in step S1, a menu display by the initial picture plane 74 of FIG. 14 is performed in step S2. Since a password registration is first necessary, by receiving a mouse click for the password registration using the initial picture plane 74, the presence or absence of the password registration is judged in step S3. In step S4, a password input is requested by the display of the password registration picture plane 76 of FIG. 15. When the input of the password of, for example, four digits is judged in step S5, the password is registered in step S6. The registration of the password is executed for both of the registration module 26 and response module 28 of the agent 25 installed in the personal terminal 24 in FIG. 3. In step S7, the response module 28 of the agent 25 is loaded as a copy into the IC card 10 and the response module 36 is loaded into the agent file 30 of the IC card 10. The response module 36 can be also loaded into the IC card 10 when executing the set-up process of the agent 25 in step S1. After completion of the password registration, the screen is again returned to the initial picture plane 74 of FIG. 14. Now, assuming that the mouse click for registration of the personal information was executed, it is discriminated in step S8. In step S9, the screen is switched to the personal information registration initial picture plane 80 in FIG. 16 and the input of the password is requested. When the password is inputted in step S10 in response to the password input request in step S9, step S11 follows. The password which has already been registered and the password inputted at present are collated. When a coincidence in the collation of the password is obtained in step S11, step S12 follows and the registration menu picture plane 82 of FIG. 17 is displayed. If the coincidence in collation of the passwords is not obtained in step S11, the registering process is finished. It is also obviously possible to construct in a manner such that when the collation coincidence is not derived, a retry counter is counted up, the processes from the password input request in step S9 are again repeated, and when the collation coincidence of the passwords is not obtained a predetermined number of retry times, for example, three times, the processing routine is finished. When the registration menu picture plane is displayed in step S12 by the collation coincidence of the passwords, the processing routine advances to step S13 in FIG. 23 and the presence or absence of the selection of the fundamental information is discriminated. When the registration selection of the fundamental information is performed, step S14 follows and a registering process of the fundamental information using the fundamental information registration picture plane 90 in FIG. 18 and the disclosure flag set picture plane 92 of FIG. 19 which is subsequently displayed is executed. When any system in the system information is selected in step S13, step S15 follows. When the registration of the information peculiar to the corresponding system, for example, the reservation system is selected, the information peculiar to the system is registered by using the reservation system registration picture plane 94 in FIG. 21. Such a registering process is repeated until the end of registration is discriminated by mouse clicking an end operation symbol in step S16. On the other hand, in the initial picture plane 74 displayed in step S8 in FIG. 22, now assuming that the operation symbol of the personal information output 74-3 was mouse clicked, the processing routine advances to step S17 in FIG. 23. A check is made to see if the mouse click to discriminate whether the output destination is the display or not by using the registration information output picture plane 96 of FIG. 21 has been performed. When the output destination is the display, the designated registration contents in the IC card 10 are displayed on the display in step S18. When the output destination is the printer, step S19 follows and the registration contents in the IC card 10 in which the output was designated are printed and outputted by the printer. The outputting process by the display or printer is also repeated until an end symbol of the registration information output picture plane 96 of FIG. 21 is mouse clicked in step S20 and it is discriminated as an end of output in step S20.

Figure 24:
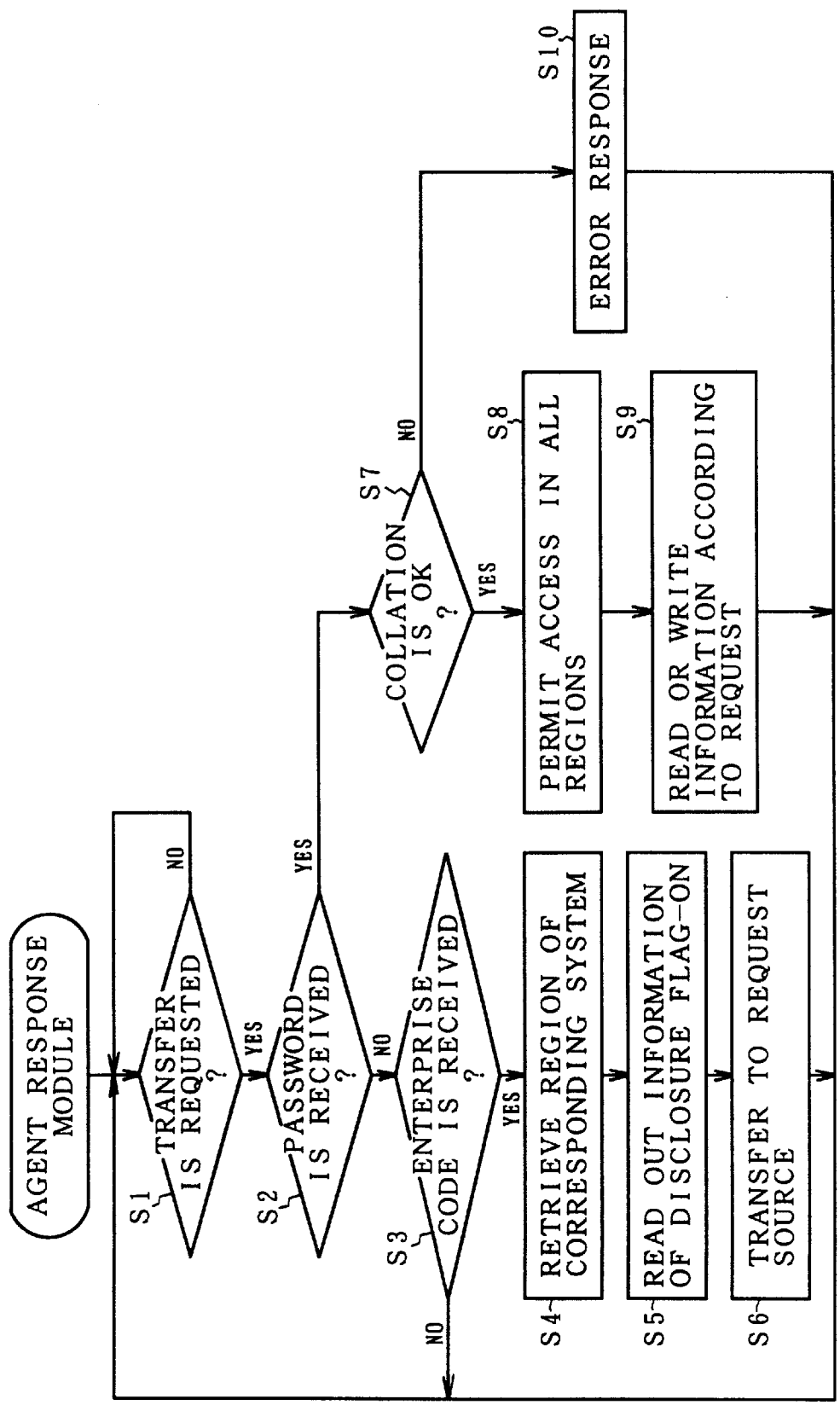
FIG. 24 is a flowchart for a responding process of a response module copied to the IC card in FIG. 3.

A flowchart of FIG. 24 shows a response process for an output request of the personal information from an external service system to the IC card 10 by the response module 36 loaded in the agent file 30 of the IC card 10 by the agent 25 installed in the personal terminal 24 in FIG. 3. The IC card 10 in which the registration of the personal information has been finished is set into, for example, the reader/writer 122-1 connected to the service providing terminal 120-1 of the reservation system 100 in FIG. 2 and is used to provide the services of the reservation system. In this state, the agent response module loaded in the IC card discriminates the presence or absence of a transfer request of the personal information from the reservation system 100 side in step S1. The transfer request of the personal information to the IC card 10 from the reservation system 100 side is issued by using an enterprise code indicative of the reservation system 100. Therefore, although the presence or absence of the reception of the password is discriminated in step S2 with respect to the transfer request, since there is the transfer request from the reservation system 100, the password cannot be received. Step S3 follows and the reception of the enterprise code is discriminated. By the reception of the enterprise code, it is recognized in step S4 that the request is the transfer request of the personal information from the reservation system 100. The fundamental information file 32 and system peculiar information file 34 in the agent file 30 provided in the IC card 10 in FIG. 3 are retrieved. Subsequently, in step S5, the attribute information whose disclosure flags are ON is read out for the reservation system 100 discriminated by the enterprise code and is transmitted to the reservation system 100 side serving as a request source in step S6. When the IC card 10 is set into the personal terminal 24 of the consumer 12 in FIG. 2 and information is registered or updated, the consumer 12 first sends the password to the IC card 10. Therefore, subsequent to the transfer request in step S1, the password is received in step S2. When the collation coincidence with the password which has already been registered is obtained in step S7, the access to the whole region in which the personal information has been stored is permitted in step S8. In step S9, therefore, the reading or writing operation of the information according to a request of the consumer can be arbitrarily executed as necessary. It will be obviously understood that if the collation coincidence of the password is not derived in step S7, an error response is transmitted to the request side in step S10.

As mentioned above, in the agent response module 36 loaded in the IC card 10, in response to the transfer request of the personal information from the service providing system, only the personal information in which the disclosure flags are set to ON is transmitted and the information in which the disclosure flags are reset to OFF is not disclosed. On the other hand, for example, when the consumer 12 himself moves and wants to change the address, by setting the IC card 10 into the personal terminal 24 and using the password, he can execute an updating process to change the address as one of the attribute information in the personal information to the address of the movement destination. As for the rewrite request from the service providing system, by providing the rewrite flag 72 as in the size information management table 50 in FIG. 10 and by setting the rewrite flag 72 into "1" as necessary, it is possible to rewrite by a service system other than the consumer 12 himself.

Specific processes when a personal information management system by the IC card 10 is constructed for the reservation system 100 in FIG. 2 as a target will now be described. A time chart of FIG. 25 relates to a series of processes which are executed for a period of time from the registration between the IC card 10 which the consumer 12 in FIG. 2 has and the reservation system 100 to the use of the service presentation. First, the consumer 12 requests the reservation system 100 side to issue the IC card 10 as shown by a broken line in step S1. In response to the request, the reservation system 100 issues the IC card 10 to the consumer 12 by using, for example, the card issuing terminal 116. When the IC card 10 is issued, the ID code of the consumer 12 is previously decided and registered. The consumer 12 who received the issue of the IC card 10 registers the attribute information to the IC card 10 in step S2. After completion of the registration of the attribute information, as shown in a reservation 130, the consumer presents the IC card to the reservation system 100 side and executes, for example, a ticket reservation of the airline or the like. The reservation system 100 side which received the request of the reservation 130 sets the presented IC card 10 into, for example, the reader/writer 122-1 of the service providing terminal 120-1 in the reservation system 100 in FIG. 2. In step S102, the IC card 10 is read. In response to the reading of the IC card, the IC card 10 side sends a telegram 132 including the ID code of the IC card 10 and an identifier "reservation" of the service request item. The reservation system 100 side which received the telegram 132 from the IC card 10 requests the IC card 10 to transfer the attribute information by a telegram 134 in step S103. An enterprise code indicative of the reservation system 100, the reservation identifier, and further, start permission information are included in the telegram 134 to request the transfer of the attribute information. The IC card 10 which received the transfer request of the attribute information by the telegram 134 displays reservation request contents to the consumer 12 and confirms in step S3. On the basis of the confirmation result, in step S4, in response to the transfer request of the attribute information from the reservation system 100, an attribute information priority and minimum admitting conditions with respect to the attribute information whose disclosure flags have been set to "1" are transferred to the reservation system 100 by a telegram 136. The attribute information is received in step S104. The reservation system 100 which received the attribute information transferred executes a retrieving process to obtain the reservation in accordance with the priority of the attributes transferred from the IC card 10 in step S105. When the retrieval result is obtained, a reservation is made in step S6 and the reservation information is replied to the IC card 10 by a telegram 138. In addition to the reservation retrieval result, attribute dissidence information indicative of the attributes in which the collation result indicates a dissidence is included in the reply information by the telegram 138. The IC card 10 which received the telegram 138 receives the reservation information in step S5 and discriminates a matching degree with the first attribute information which was reserved. When the matching degree is equal to or larger than a predetermined admitting condition, a telegram 140 indicative of the admission result is sent to the reservation system 100 in step S6. In response to the telegram 140, the reservation system 100 finishes the reserving process in step S107. Since the series of reserving processes have been finished, the IC card 10 is returned to the consumer. When the check result of the matching degree between the reservation information received in step S5 and the attribute information which was reserved doesn't satisfy the predetermined admitting condition, information indicating that the admission of the reservation cannot be permitted is responded to the reservation system 100. As information indicating that the admission of the reservation cannot be performed, since a proper retrieval result is not derived from the attribute information so far, a telegram is sent to the reservation system 100 together with the changed attribute information. Therefore, the reservation system 100 which received the admission impossible information performs again the reception of the attribute information and the retrieval according to the attribute priority from step S104 on the basis of the changed attribute information sent at the same time. The reservation result which was newly performed is replied to the IC card 10 by the telegram 138 in step S106. The process to discriminate the matching degree in step S5 is repeated. Thus, even if the reservation result cannot be admitted, by properly changing the attribute information of the reservation, the consumer can obtain a desired reservation.

Figure 25:
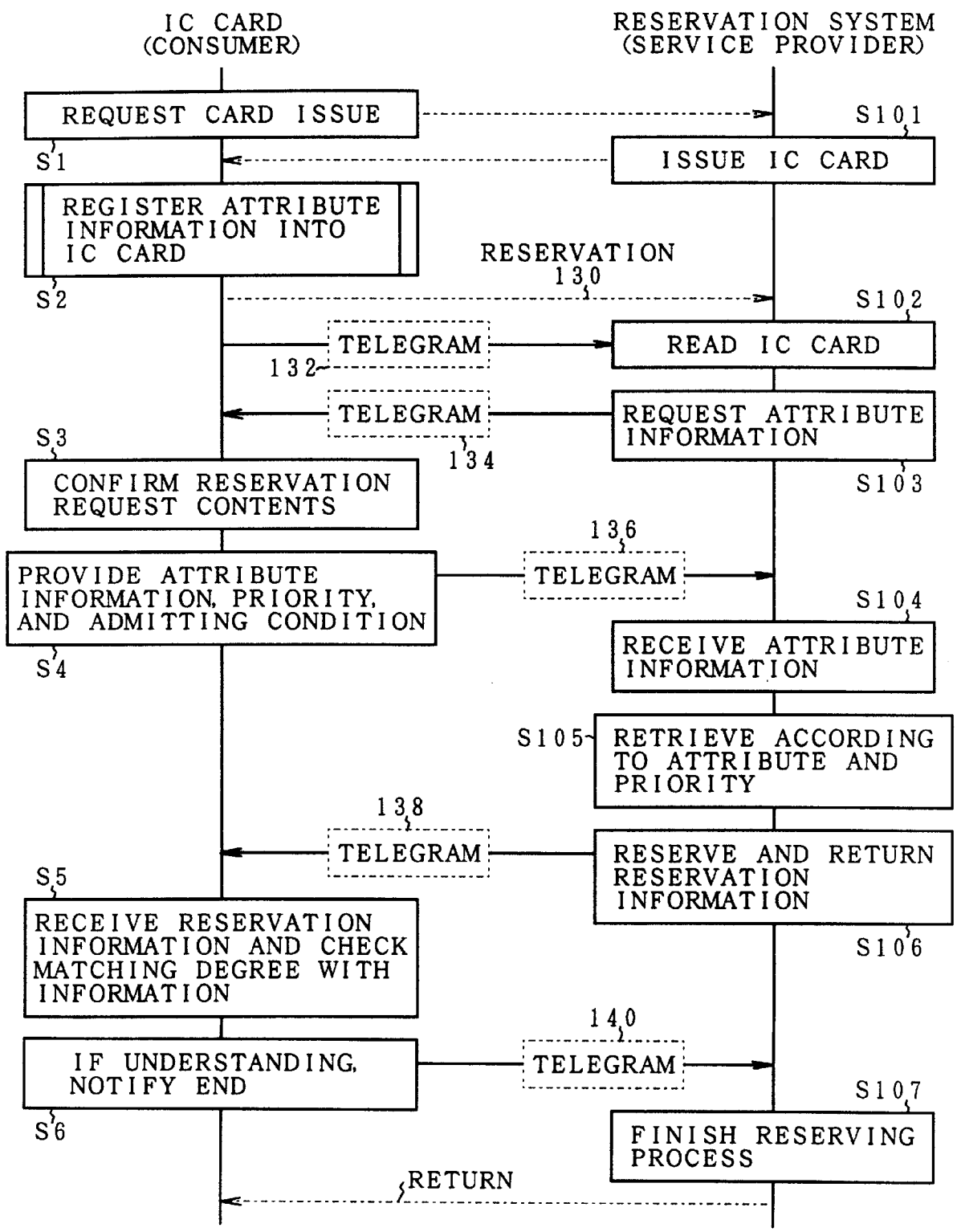
FIG. 25 is a time chart showing a processing procedure of personal information in the reservation system in FIG. 2.
Figure 26:
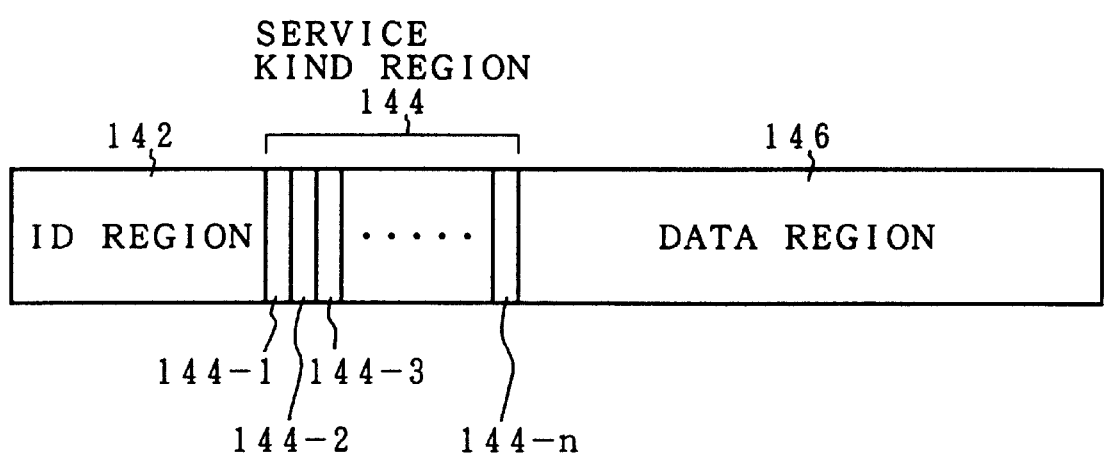
FIG. 26 is an explanatory diagram of a telegram format which is used by the responding process in FIG. 25.

FIG. 26 shows a format of the telegram which is transmitted and received between the IC card 10 and the reservation system 100 in FIG. 25. The telegram format is constructed by an ID region 142, a service kind region 144, and a data region 146. When the telegram is sent from the IC card 10 to the reservation system 100, the ID code registered in the IC card 10 is stored into the ID region 142. When the telegram is transferred from the reservation system 100 to the IC card 10, an enterprise code indicative of a service treating company is stored. The service kind region 144 has storage regions 144-1 to 144-n of the identifiers corresponding to the service providing systems. It is sufficient to set a flag "1" into the identifier region corresponding to the system to be used for transmission and reception of the personal information. In this case, it is also possible to set the flag "1" into a plurality of identifier regions, thereby enabling the personal information to be simultaneously provided to a plurality of systems.

Figure 27A:
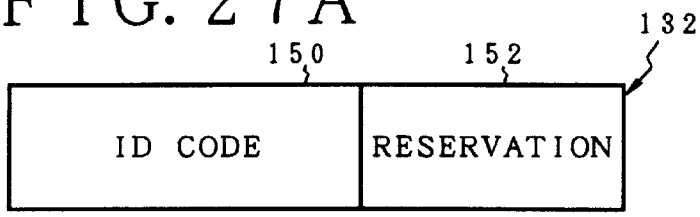
FIGS. 27A to 27F are specific explanatory diagrams of the telegram format in FIG. 25.
Figure 27B:
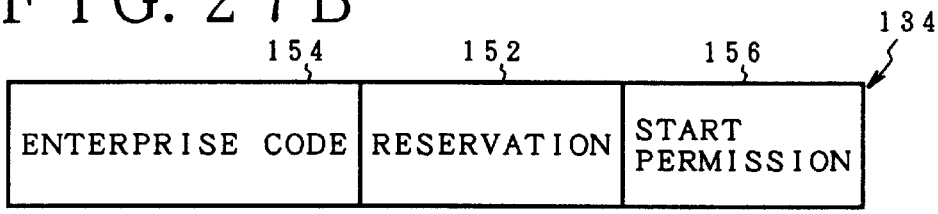
Figure 27C:
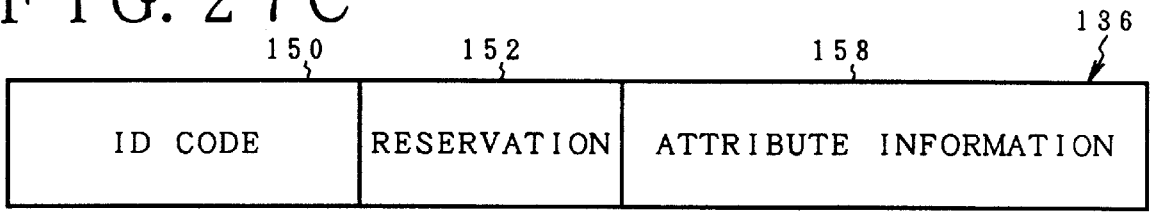
Figure 27D:
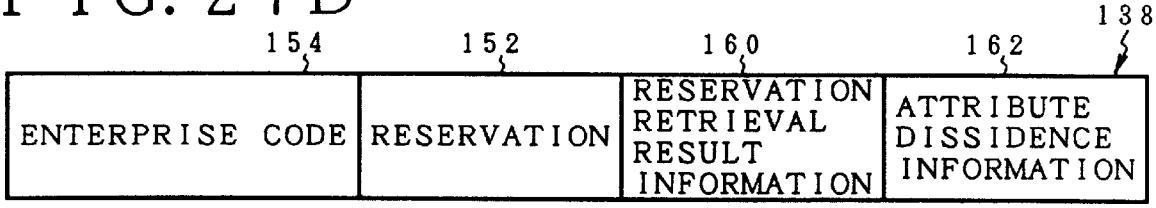
Figure 27E:
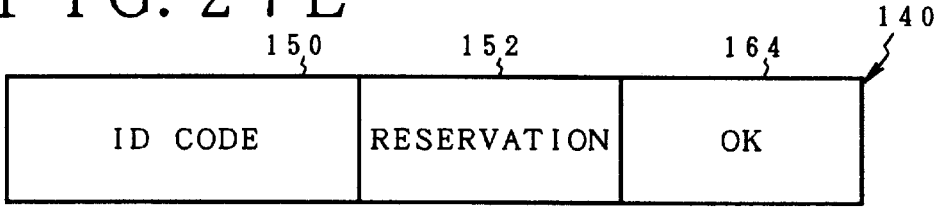
Figure 27F:
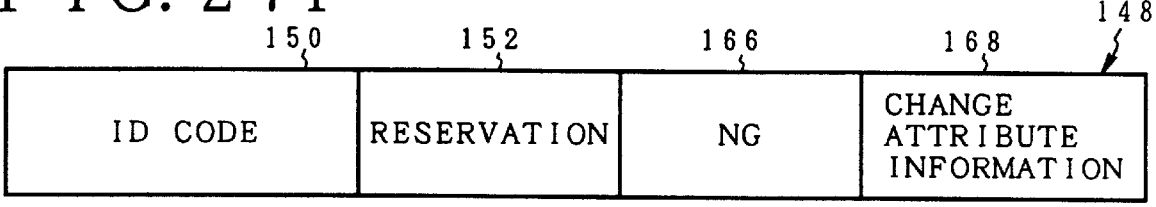

FIGS. 27A to 27F show specific format contents of the telegrams which are transmitted and received between the IC card 10 and the reservation system 100 in FIG. 25. First, FIG. 27A shows the telegram 132 which is sent from the IC card 10 to the reservation system 100 when the IC card is first read in step S102. Subsequent to an ID code 150 indicative of the IC card 10, a reservation identifier 152 indicative of the reservation has been stored. The reservation identifier 152 is included in all of the subsequent telegrams. FIG. 27B shows the telegram 134 to request the transfer of the attribute information which is performed from the reservation system 100 to the IC card 10 in step S103 in FIG. 25. In the telegram 134, subsequent to an enterprise code 154 indicative of the reservation system 100, the reservation identifier 152 is provided and start permission information 156 to activate an agent response module of the IC card 10 is subsequently provided. The telegram 136 of FIG. 27C is a telegram to provide the attribute information from the IC card 10 to the reservation system 100 in step S4 in FIG. 25. Subsequent to the ID code 150 indicative of the IC card 10, the reservation identifier 152 is provided and attribute information 158 is further provided. The priority and the minimum admitting conditions are also included in the attribute information 158. The telegram 138 in FIG. 27D is a telegram to reply the reserved reservation information which is sent from the reservation system 100 to the IC card 10 in step S106 in FIG. 25. Subsequent to the enterprise code 154, the reservation identifier 152 is provided and reservation retrieval result information 160 and attribute dissidence information 162 in the retrieval are further provided. FIG. 27E shows a telegram to notify of the admission in step S6 in FIG. 25. Subsequent to the ID code 150 and reservation identifier 152, admission information 164 indicative of the admission of the reservation result is provided. FIG. 27F shows a telegram 148 which is returned when the admission of the reservation is impossible from the check result about the matching degree between the reservation information and the attribute information in step S5 in FIG. 25. Subsequent to the ID code 150 and reservation identifier 152, a reservation impossible response 166 is provided. To provide attribute information to be used for a new reservation retrieval, change attribute information 168 changed by the consumer is further provided.

Figure 28:
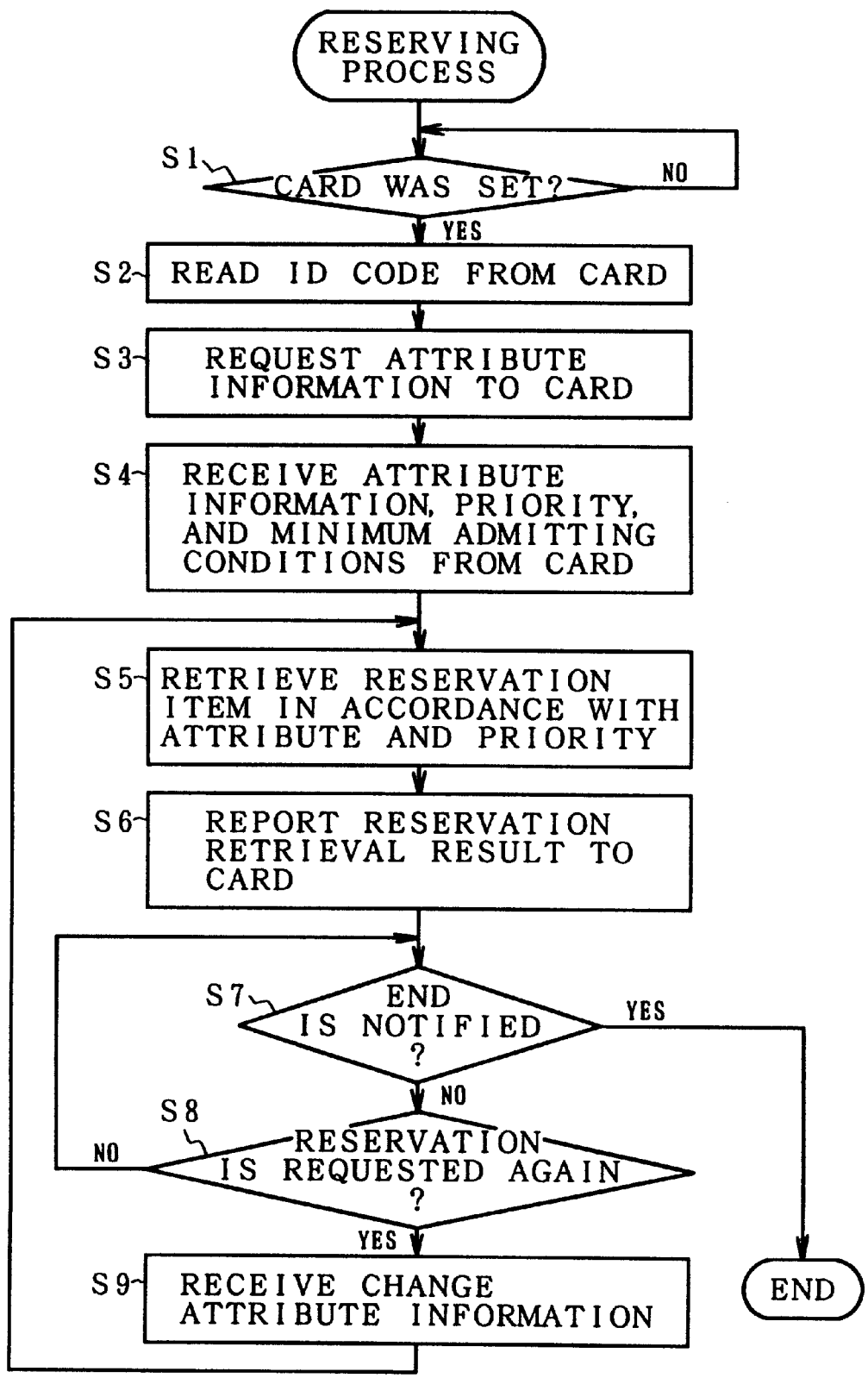
FIG. 28 is a flowchart for a process of a reservation system using updating information of the IC card.

A flowchart of FIG. 28 relates to the reserving process in the reservation system 100 using the personal information from the IC card in FIG. 25. First in step S1, a check is made to see if the IC card has been set to the service providing terminal of the reservation system. When the IC card 10 is set into the terminal, step S2 follows and the ID code and the reservation identifier are read out from the IC card. In step S3, the attribute information is requested to the IC card. In step S4, when the attribute information priority and the minimum admitting conditions are received from the IC card in step S4, a reservation item is retrieved in accordance with the attribute information and its priority in step S5. In this instance, when the reservation item according to the priority of the attribute information cannot be retrieved, the reservation item is again retrieved in accordance with the minimum admitting conditions received in step S4. After completion of the retrieval of the reservation item in step S5, the reservation retrieval result is reported to the IC card 10 in step S6. In step S7, the presence or absence of an end notification based on the admission for the reservation retrieval result from the IC card 10 side is discriminated. When there is the end notification, since this means that the reservation retrieval result was accepted, the series of processes are finished. When there is no end notification, a check is made to see if the reservation has been requested again in step S8. Namely, when the reservation retrieval result indicates that the admission is impossible on the IC card 10 side, an admission impossible response is performed. Therefore, it is judged that the reservation was requested again. The processing routine advances to step S9. The change attribute information which is simultaneously sent is received. The processing routine is returned to step S5 and the retrieval of the reservation item is retried in accordance with the attribute information after the change which was newly received, its priority, and minimum admitting conditions.

According to the invention as mentioned above, the consumer himself who possesses the IC card registers the personal information into the IC card, manages it, sets the personal information registered in the IC card into a proper service providing apparatus, and discloses the personal information as necessary in response to the output request. Thus, the collection, management, and refreshing of the personal information in the treating company which owns the service providing apparatus are fundamentally unnecessary. The burden regarding the management and operation of the personal information in the treating company of the service providing apparatus can be remarkably reduced. According to the invention, since the consumer himself can freely decide whether the personal information registered in the IC card is disclosed or not, the personal information can be disclosed by the judgment of the consumer himself in response to the request from the service providing apparatus. The privacy can be certainly protected. On the other hand, personal information which is difficult to tell by mouth when the consumer receives services or purchases something can be provided to the service providing apparatus in a form of data from the IC card. Therefore, the services of the desired contents of the consumer can be certainly received. Further, when the personal information is registered, by using the corresponding region which is opened in the IC card issued from the bank, the IC card for bank can be used as a data base of the personal information in all of the service providing apparatuses with the terminal using the IC card. A use value of the IC card for bank is remarkably raised and the invention can largely contribute to the spread of the IC card. Moreover, the service providing company as a card issuing source can obtain an advantage such that a payment of a money amount for the services provided in accordance with the personal information in the IC card can be automatically selected.

The processes of the reservation system of FIG. 28 are merely shown as an example. So long as a system such that the personal information with the disclosure flags is stored into the IC card and is read out in accordance with a request from the reservation system and is used for retrieval, the invention is not exactly limited by a form of processes of the reservation system itself. As mentioned above, as a form of the service system using the personal information of the IC card of the invention, it is sufficient that the personal information registered in the IC card can be used as a minimum necessary limit and it is never limited by the form of the service system. Although the above embodiments have been shown and described with respect to the IC card with the bank standard format as an example, the invention is not limited to the IC card which is issued from the bank but the invention can be substantially similarly applied to a proper IC card so long as it has therein the memory and processor.

What is claimed is:

1. A personal information management system, comprising:
   a card corresponding to a specified organization and having therein an integrated circuit including a processor and a memory, the memory including a standard format area used by the specified organization and a lending area used by a user of the card, the lending area having allocated therein a personal information area used in transactions with the specified organization;
   a terminal device used by a consumer to perform at least one of registering personal information on the card and updating personal information on the card; and
   a service providing apparatus that reads a selected portion of the personal information from said card when the personal information has been registered thereto and provides the selected portion of the personal information to a service providing system.

2. A system according to claim 1, wherein said personal information includes personal attribute information, hobby information, and personal taste information.

3. A system according to claim 1, wherein said terminal device registers to said card personal attribute information including fundamental information selected from an address, a name, an age, a birthday, and a telephone number.

4. A system according to claim 3, wherein the personal information registered by said terminal device includes at least one of health management information, family information, and economic information.

5. A system according to claim 4, wherein said terminal device registers the personal information in accordance with a type of service provided by the service providing system.

6. A system according to claim 1, wherein sad card is an IC card for a bank, is used for electronic transactions with the bank and performs a payment operation for a provided service through a selected electronic transaction.

7. A system according to claim 1, wherein:
   the specified organization is enrolled in a credit service provided by a credit company; and
   said card is issued to a consumer by the credit company.

8. A system according to claim 1, wherein:
   the memory of said card stores a disclosure flag corresponding to specific information included in the personal information, the disclosure flag indicating whether a disclosure of the specific personal information is authorized, whereby said service providing apparatus provides a service according to the specific personal information only when required disclosure flags have been set.

9. A system according to claim 1, wherein:
   said terminal device stores, to the memory of said card, a priority corresponding to the personal information; and
   said service providing apparatus provides a service according to the priority.

10. A personal information management system, comprising:
    a terminal device for a card having an integrated circuit including a processor and a memory, said terminal device performing at least one of registering and updating personal information to a specified card and storing on the specified card a priority corresponding to the personal information and minimum admitting conditions corresponding to the priority; and
    a service providing apparatus that reads out selected personal information from the card when the personal information has been stored thereto, said service providing device providing the selected personal information to a service providing system and providing a service according to the priority when the service is available, referring to the minimum admitting conditions when the service according to the priority is not available, and providing an alternate service according to the minimum admitting conditions when the service according to the priority is not available and the alternate service is available.

11. A system according to claim 10, wherein the personal information includes personal attribute information, hobby information, and personal taste information.

12. A system according to claim 10, wherein said terminal device registers to the card fundamental information included in the personal information, the fundamental information including information selected from an address, a name, an age, a birthday, and a telephone number.

13. A system according to claim 12, wherein said terminal device registers to the card at least one of health management information, family information, and economic information.

14. A system according to claim 13, wherein said terminal device registers the personal information to the card according to a type of service provided by the service providing system.

15. A system according to claim 10, wherein the card is used for electronic transactions with a specified organization and the card performs a payment for a provided service through a selected electronic transaction.

16. A system according to claim 10, wherein:
    the card is issued by a credit company providing a credit service; and
    a specified organization is enrolled in the credit service and provides services through the service providing system.

17. A system according to claim 10, wherein the card stores a disclosure flag corresponding to specific information included in the personal information, the disclosure flag indicating whether a disclosure of the specific personal information is authorized, whereby said service providing apparatus provides a service according to the specific personal information only when the disclosure flag has been set.

18. A system according to claim 10, wherein:
    said terminal device stores to the card an allowable error time as a minimum admitting condition corresponding to a request time, the request time being stored to the card as a priority corresponding to a service to be provided by said service providing apparatus; and
    said service providing apparatus provides an alternate service when a service that satisfies the request time is not available and the alternate service is available and satisfies the allowable error time.

19. A system according to claim 10, wherein:
    said terminal device stores to the card a rewrite flag indicating whether a third party is authorized to rewrite the personal information;
    skid terminal device sets the rewrite flag with respect to a portion of the personal information for which rewriting is authorized; and
    said service providing apparatus refers to the rewrite flag when updating of the portion of the personal information is appropriate in conjunction with providing a requested service and, upon referral to the rewrite flag, rewrites the portion of the personal information to the card when the rewrite flag has been set.

20. A system according to claim 1, wherein:
    said terminal device stores, to the memory of said card, a rewrite flag indicating whether a third party is authorized to rewrite the personal information;
    said terminal device sets the rewrite flag with respect to a portion of the personal information for which rewriting is authorized: and
    said service providing apparatus refers to the rewrite flag when updating of the portion of the personal information is appropriate in conjunction with providing a requested service, and rewrites the personal information to said card when the rewrite flag has been set.

* * * * *